United States Patent
Watarai et al.

[19]

[11] Patent Number: 5,941,125
[45] Date of Patent: Aug. 24, 1999

[54] BICYCLE SHIFTING APPARATUS HAVING REMOTELY LOCATED LEVERS FOR OPERATING A SINGLE TRANSMISSION

[75] Inventors: Etsuyoshi Watarai, Izumi; Kenji Ose; Noriaki Takahashi, both of Sakai, all of Japan

[73] Assignee: Shimano, Inc., Osaka, Japan

[21] Appl. No.: 08/995,276

[22] Filed: Dec. 19, 1997

Related U.S. Application Data

[63] Continuation-in-part of application No. 08/770,982, Dec. 20, 1996, abandoned, which is a continuation-in-part of application No. 08/579,931, Dec. 28, 1995, abandoned.

[30] Foreign Application Priority Data

Dec. 19, 1996 [JP] Japan .................................. 8-340016

[51] Int. Cl.⁶ .......................... B62M 25/04; B62K 23/06; G05G 11/00
[52] U.S. Cl. ....................... 74/473.14; 74/480 R; 74/489; 74/502.2
[58] Field of Search ........................... 74/473.13, 473.14, 74/480 R, 489, 502.2

[56] References Cited

U.S. PATENT DOCUMENTS

| | | | |
|---|---|---|---|
| 2,796,140 | 6/1957 | Knolle | 180/12 |
| 3,403,577 | 10/1968 | Ozaki | 74/480 |
| 3,800,614 | 4/1974 | Johnson | 74/473 R |
| 3,861,234 | 1/1975 | Cristie | 74/480 |
| 4,245,522 | 1/1981 | Robinson | 74/480 |
| 4,304,145 | 12/1981 | Shimano | 74/480 R |
| 5,020,387 | 6/1991 | Nagano | 74/475 |
| 5,429,012 | 7/1995 | Ikeda et al. | 74/475 |
| 5,768,945 | 6/1998 | Ose | 74/489 |

FOREIGN PATENT DOCUMENTS

| | | | |
|---|---|---|---|
| 0 719 701 A2 | 7/1996 | European Pat. Off. . | |
| 2654698 | 5/1991 | France | B62K 23/00 |
| 5-319355 | 12/1993 | Japan . | |

OTHER PUBLICATIONS

European search report for EP 95309511.4, dated Apr. 1, 1997.

European Search Report for EP 97310352.6, dated Jun. 23, 1998.

Primary Examiner—Allan D. Herrmann
Attorney, Agent, or Firm—James A. Deland

[57] ABSTRACT

A first shifting control device is located at a first position on the bicycle, and a second shifting control device is located at a second position on the bicycle. The first shifting control device includes a first shifting lever for causing the first shifting control device to pull and release a first transmission element, and the second shifting control device includes a second shifting lever for causing the second shifting control device to pull and release a second transmission element. An interlocking mechanism interlocks the first shifting lever and the second shifting lever so that movement of either the first shifting lever or the second shifting lever causes the bicycle shifting control apparatus to shift the bicycle transmission.

65 Claims, 22 Drawing Sheets

BICYCLE SHIFTING APPARATUS HAVING REMOTELY LOCATED LEVERS FOR OPERATING A SINGLE TRANSMISSION

CROSS-REFERENCE TO RELATED APPLICATIONS

This application is a continuation-in-part of application Ser. No. 08/770,982, filed Dec. 20, 1996, now abandoned which is a continuation-in-part of application Ser. No. 08/579,931, filed Dec. 28, 1995, now abandoned.

BACKGROUND OF THE INVENTION

The present invention is directed to bicycle control devices and, more particularly, to a bicycle shifting apparatus having multiple remotely located levers for operating a single bicycle transmission.

Bicycles are typically equipped with a multistage front chain wheel in front and a multistage sprocket in the rear. These are connected by a chain, which provides rotational torque. The optimal gear ratio is selected, depending on the running speed, by selecting the multistage front chain wheel and multistage sprocket around which the chain is to be engaged. The shifting operations normally involve the operation of a shifting lever which can be operated from the grip position of the handle bars.

Many types of bicycle handle bars are shaped to provide for many different grip positions. For example, one position may be provided for riding at normal speed, and another position may be provided for riding at high speed, such as on hill roads, and usually designed to ward off wind resistance. Unfortunately, conventional shifting control devices are located only in a specific grip position. Thus, when the grip position is changed, it is not possible to control the shifting from the new position, making it necessary to move back to the original grip position in order to shift. Moving the hands back and forth and locating the proper grip positions wastes time and hinders high performance riding.

SUMMARY OF THE INVENTION

The present invention is directed to bicycle shifting control device which allows shifting to be accomplished from different positions on the handle bars (or other structural member of the bicycle). In one embodiment of the present invention, a first shifting control device is located at a first position on the bicycle, and a second shifting control device is located at a second position on the bicycle. The first shifting control device includes a first shifting lever for causing the first shifting control device to pull and release a first transmission element, and the second shifting control device includes a second shifting lever for causing the second shifting control device to pull and release a second transmission element. An interlocking mechanism interlocks the first shifting control device and the second shifting control device so that movement of either the first shifting lever or the second shifting lever causes the bicycle shifting control apparatus to shift the bicycle transmission.

Interlocking may be accomplished in a number of ways. In one specific embodiment, the interlocking mechanism comprises a connector for connecting the first transmission element and the second transmission element to the bicycle transmission. If desired, the connector may take the form of a joint for connecting the first transmission element and the second transmission element together and to a third transmission element so that the third transmission element may be connected to the bicycle transmission. In another specific embodiment, the interlocking mechanism may comprise a connector for connecting the second transmission element to the first shifting lever so that movement of the first shifting lever causes a corresponding movement of the second transmission element. In yet another embodiment which may be applied to a first shifting control device of the type which has one lever for upshifting the bicycle transmission and another lever for downshifting the bicycle transmission, the second shifting control device may include one or two levers for controlling two transmission elements, wherein each transmission element is connected to one of the levers on the first shifting control device.

DETAILED DESCRIPTION OF THE EMBODIMENTS

Figure 1:
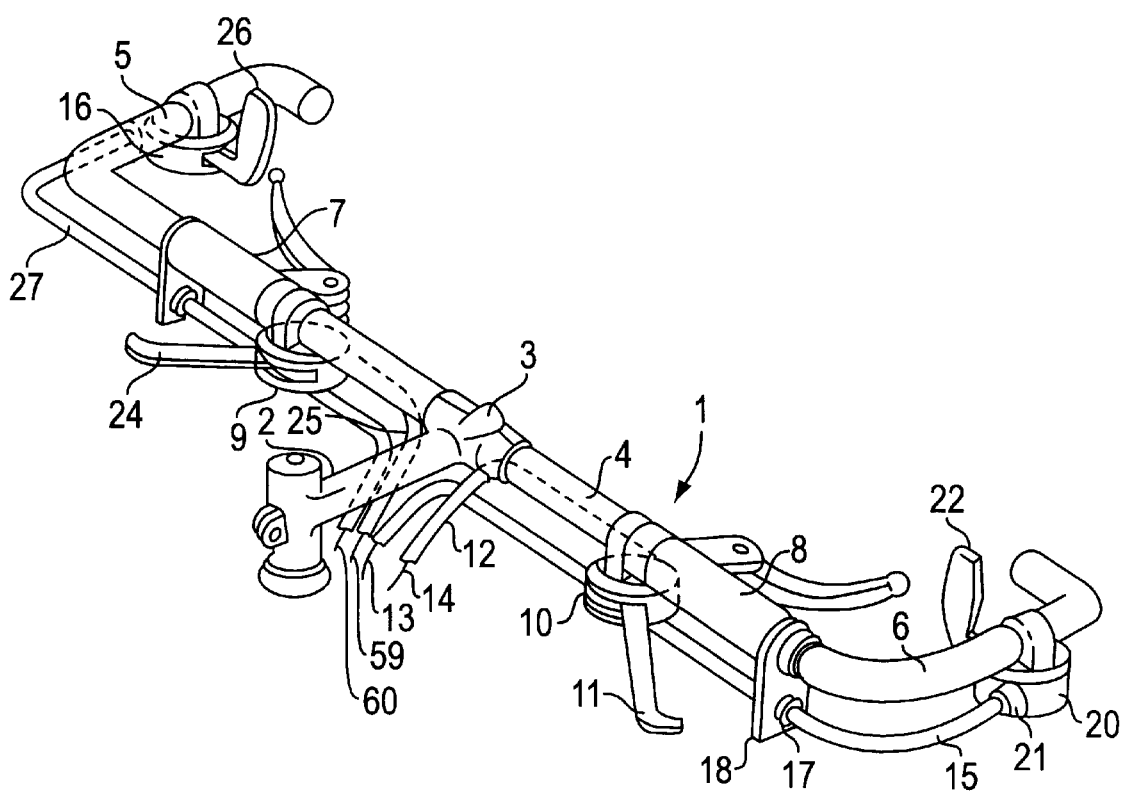
FIG. 1 is an oblique view of handle bars provided with a particular embodiment of a bicycle shifting control mechanism according to the present invention.
Figure 2:
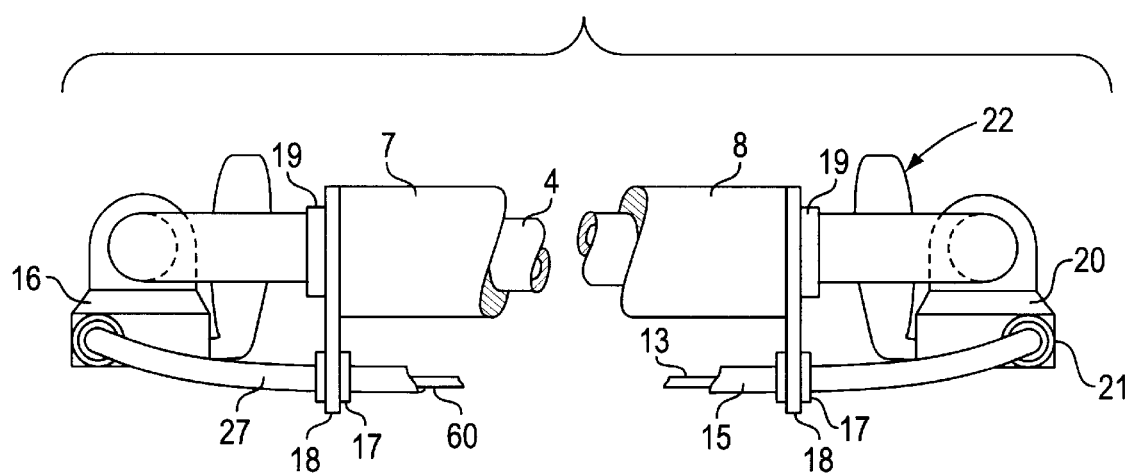
FIG. 2 is a front view depicting a particular embodiment of fixtures for fixing cables to the handle bars.

FIGS. 1 and 2 show handle bars provided with a particular embodiment of a bicycle shifting control mechanism according to the present invention. In this embodiment, the handle bars 1 are handle bars for a mountain bike. A horizontally arranged stem component 2 is connected to a bicycle head pipe (not shown), and a cross component 4 is fixed to a stem bracket 3 at the end of the stem component 2. The cross component 4 is made of a metal pipe, both ends of which are bent at about a 90 degree angle. These parts constitute the side grips 5 and 6. Tubular synthetic resin grip members 7 and 8 are located on the cross component 4. These grip members 7 and 8 are gripped when the handle bars are operated during normal running for steering purposes.

A first front shifting control device 9 and a first rear shifting control device 10 are located transversely to the grip members 7 and 8. The first front shifting control device 9 is used to select a front chain wheel (not shown) for transferring the chain. More specifically, a first front shifting lever 24 in the first front shifting control device 9 is rotated to pull a wire 59 inside a cable 25 so as to drive and shift the front derailleur (not shown). The first rear shifting control device 10 is used to select one of the rear multistage sprockets (not shown). More specifically, a first rear shifting lever 11 in the first rear shifting control device 10 is rotated to pull a wire 14 in a cable 12 so as to drive the rear derailleur (not shown) and shift gears. The structure and function of the first rear shifting control device 10 is the same as the first front shifting control device 9 and thus will not be described in detail.

A second front shift control device 16 is located at the side grip component 5. This second front shifting control device 16 has essentially the same structure and function as the first front shifting control device 9, allowing front shifting to be controlled from this position as well. A second front shifting lever 26 in the second front shifting control device 16 is rotated to pull a wire 60 in a cable 27 so as to drive and shift the front derailleur (not shown). A second rear shifting control device 20 is located at the side grip component 6 on the same handle bars 1. The second rear shifting control device 20 has essentially the same structure and function as the first rear shifting control device 10, allowing rear shifting to be controlled from this position as well. A second rear shifting lever 22 in the second rear shifting control device 20 is rotated to pull a wire 13 in a cable 15 so as to drive and shift the rear derailleur (not shown).

The intermediate sections of the cables 15 and 27 are held by an annular cable clip 17. The cable clip 17 is fixed to the bottom of a plate-shaped anchoring metal fixture 18. The top of the anchoring metal fixture 18 is fixed with a nut 19 to one end of the corresponding grip member 7,8. A cable adjusting unit 21 is provided at the inlet of second rear shifting control device 20. This cable adjusting unit 21 is designed to fine tune the angle and position of the second rear shifting lever 22 by moving the outer casing 15 and the cable 13 inside in relation to each other. A similar cable adjusting unit 23 is provided at the inlet of second front shifting control unit 16.

Figure 3:
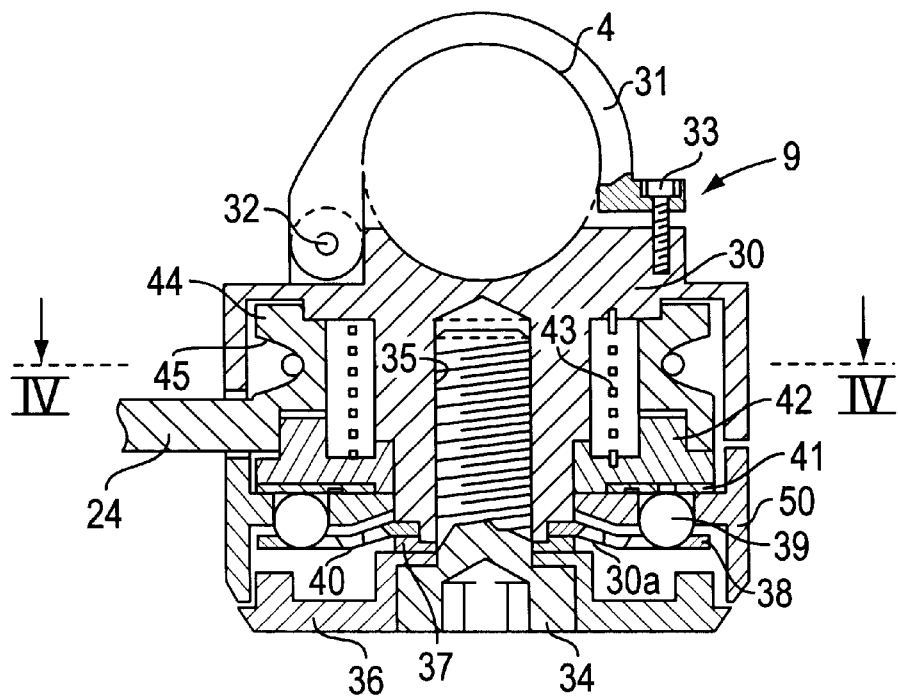
FIG. 3 is a cross sectional view of a particular embodiment of a shift control device shown in FIG. 1.
Figure 4:
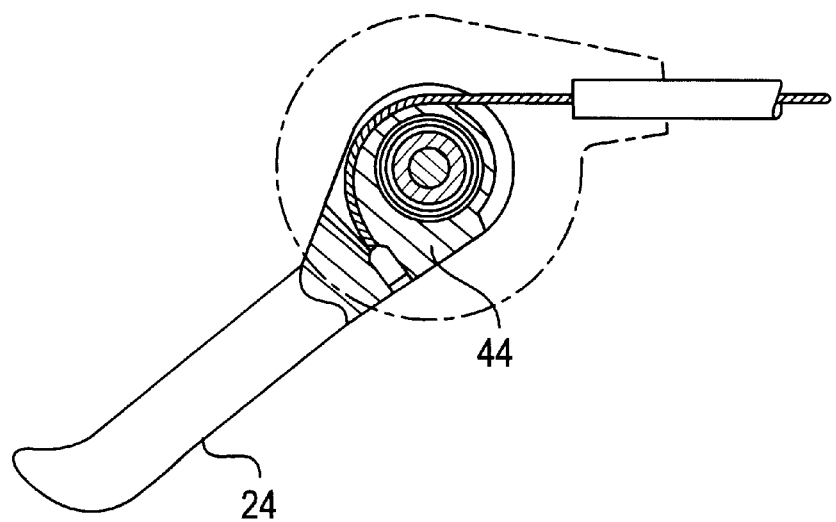
FIG. 4 is a partial cross sectional view of a shifting lever taken along line IV—IV in FIG. 3.

FIG. 3 is a cross section depicting the interior of the first front shifting control device 9, and FIG. 4 is a partial cross section of the shifting lever when taken along line IV—IV in FIG. 3. As shown in FIG. 3, a pedestal 30 comprises the main body of the shifting control device and is fixed by a band member 31 to the cross component 4. One end of the band member 31 is established on the pedestal 30 so that it is rockable at a shaft 32, while the other end is fixed to the cross component 4 by a bolt 33.

Figure 5:
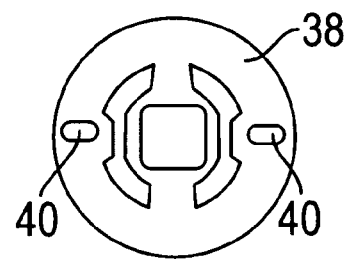
FIG. 5 is a plan view of a particular embodiment of a plate spring used in the shifting control device shown in FIG. 3.
Figure 6:
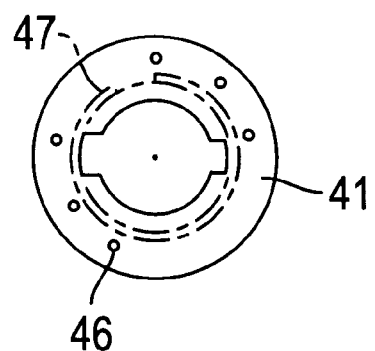
FIG. 6 is a plan view of a particular embodiment of a position-determining plate used in the shifting control device shown in FIG. 3.
Figure 7:
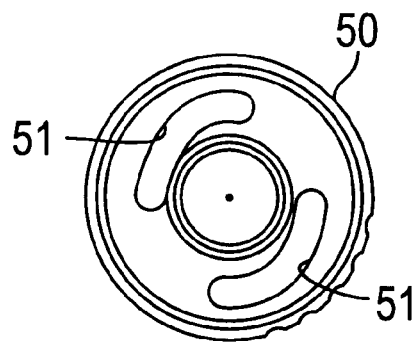
FIG. 7 is a plan view of a particular embodiment of a clamp used in the shifting control device shown in FIG. 3.

A fixing bolt 34 is screwed into a screw hole 35 on the pedestal 30. A floor cover 36, a metal washer 37, and a plate spring 38 are fixed between the pedestal 30 and the fixing bolt 34. The floor cover 36 is a cover for the base, and the plate spring 38 is provided to push the position-determining ball 39 upward. The plate spring 38 is in the form of a disk, and ball-retaining holes 40 for determining the position of, and holding, the position-determining ball 39 are formed in the radial direction (see FIG. 5). The position-determining ball 39 can accordingly move only in the radial direction of the ball-retaining holes 40.

A position-determining plate 41 is arranged in the direction opposite the plate spring 38, with the position-determining ball 39 sandwiched between. The position-determining plate 41 is integrally fixed to the end face of a rotating cylinder member 42. Three position-determining holes 46 as well as position-determining holes 46 that differ from these by 180 degrees are formed in outer peripheral positions on the position-determining plate 41, for a total of six position-determining holes 46. Three position-determining holes 46 are located at the low L, middle M, and top T shifting ratios of the front shifting device. One position-determining ball 39 is inserted for these three position-determining holes 46, for a total of two position-determining balls 39 for all six holes. Friction components 47 in the form of rings are formed along the inside periphery of the position-determining holes 46 of the position-determining plate 41.

A clamp 50 is slidably and rotatably located on the cylindrical component 30a of the pedestal 30. Ball-retaining holes 51 are formed in the circumferential direction in the clamp 50. The position-determining balls 39 are held in the ball-retaining holes 51. The center position of the ball-retaining holes 51 expands in the radial direction. When the clamp 50 is rotated, the position-determining ball 39 in the ball-retaining hole 51 is thus moved in the radial direction and moves to the friction component 47 of the position-determining plate 41, where it is clamped. The rotating cylinder member 42 is slidably and rotatably located in part of the cylindrical part 30a of the pedestal 30.

A coiled return spring 43 is located between the rotating cylinder component 42 and the pedestal 30. One end of spring 43 is fixed to the rotating cylinder component 42, and the other end is fixed to the pedestal 30. The return spring 43 is energized in the direction counter to the energizing force of a return spring in the rear shifter (not shown), so as to equalize the torque needed to operate the first front shifting lever 24.

A wire-winding drum 44 is fixed along the outer periphery of the rotating cylinder component 42. A U-shaped concave part 45 is formed along the outer periphery of the wire-winding drum 44. As shown in FIG. 4, the distance in the radial direction of the concave component 45 varies depending on the angle and position. The first front shifting lever 24 is integrally provided on the wire-winding drum 44. This first front shifting lever 24 is rotated to allow the wire-winding drum 44 to be rotated. The concave component 45 of the wire-winding drum 44 is for winding the push-pull cable 59. Since the distance in the radial direction varies depending on the angle and position, the lever ratio varies according to the angle and position when the first front shifting lever 24 is operated.

To operate the first front shifting control device 9, the first front shifting lever 24 is operated so as to rotate the wire-winding drum 44. When the wire-winding drum 44 is thus rotated, the push-pull cable 59 is wound along the concave component 45, pulling the wire in the cable 25 and effecting the necessary shifting operation. When the wire-winding drum 44 is rotated, the integral rotating cylinder component 42 and position-determining plate 41 are also rotated with it at the same time. Although the position-determining ball 39 can move only in the radial direction by means of the ball-retaining hole 40, it is prevented from moving in the radial direction by means of the ball-retaining hole 51 of the clamp 50, so that it cannot move.

As a result of this rotation, the position-determining ball 39, which has stopped, is inserted into the next position-determining hole 46 of the position-determining plate 41, where it functions to determine position. That is, if the initial position is the low L position, the position of the first front shifting lever 24, winding drum 44, rotating cylinder component 42, and position-determining plate 41 moves to the next middle M position.

The following operations are done to execute this position determination in a non-stepwise manner. When the clamp 50 is rotated, the position-determining ball 39 is moved in the radial direction by the ball-retaining hole 51, allowing the ball to move to the friction component 47. The position-determining ball 39 fixes the position-determining plate 41 by means of the friction component 47. The position-determining plate 41 cannot be rotated, so the rotating cylinder component 42 can be fixed at a desired location.

The internal structure of the second front shifting control device 16 is the same as that of the first front shifting device 9 and thus will not be described in detail. Similarly, a detailed description will also be omitted for the internal structure of the first rear, shifting control device 10 and second rear shifting control device 20 since they are essentially the same, except for the different number of shifting stages. Alternatively, these shifting control devices may have another well-known structure.

Figure 8:
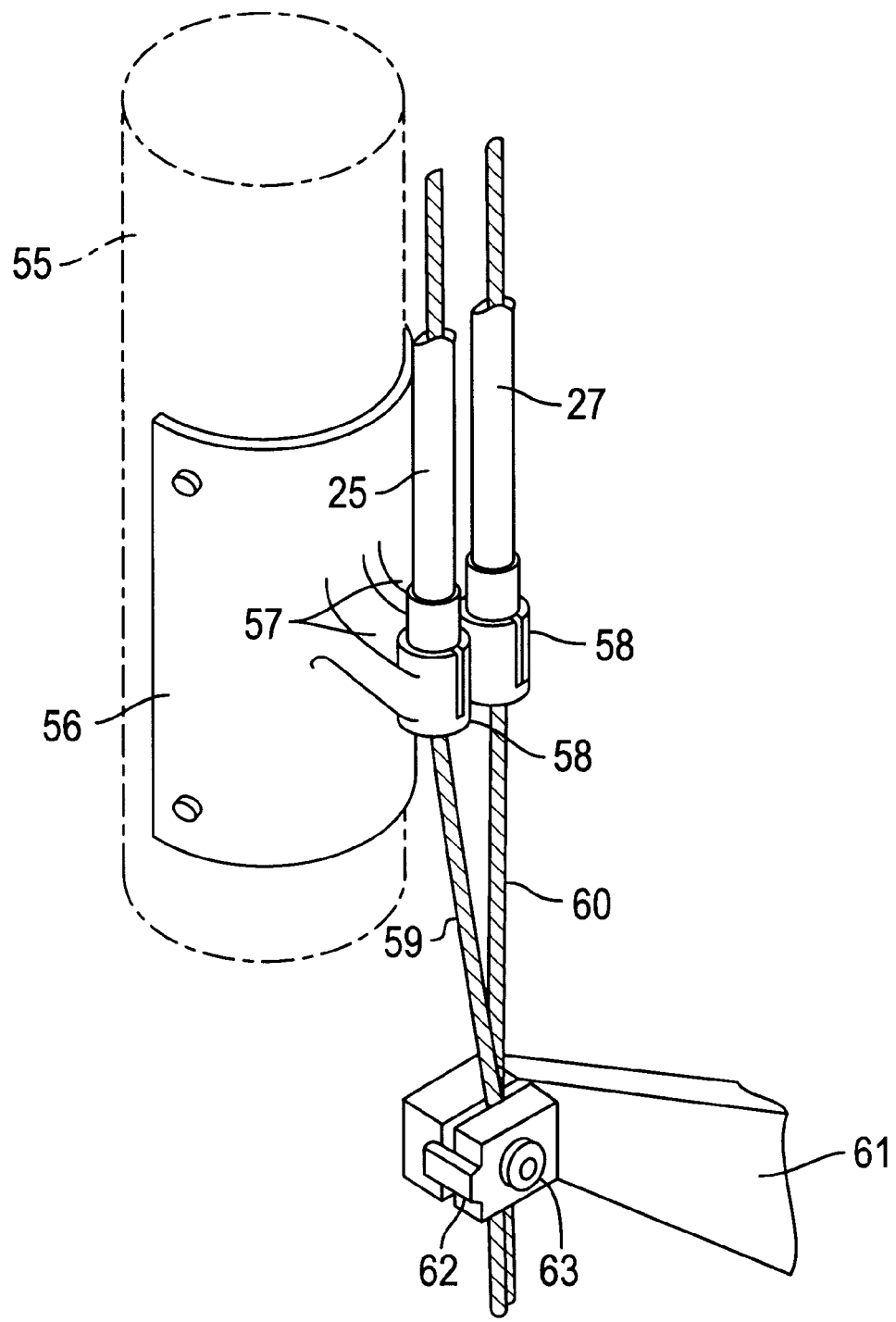
FIG. 8 depicts a particular embodiment of a structure for fixing the cables and wires of a corresponding pair of the shifting control devices shown in FIG. 1.

FIG. 8 illustrates the method for fixing the cables and wires of the first and second front shifting control devices. A bracket 56 is welded and/or fixed by rivets to the vertical frame 55. Two cable support arms 57 protrude from the bracket 56. Tubular cable receivers 58 and 58 are integrally provided at the tip of each cable support arm 57. These cable receivers 58 are provided with floors. Holes through which wire is passed are opened in these floors, and cable caps for cables 25 and 27 are inserted into the cable receivers 58 to support them. One end each of the wire 59 of the cable 25 and of the wire 60 of the cable 27 is fixed to a front derailleur driving link 61. More specifically, one end of each of the wires 59 and 60 is inserted into the groove of a fixing plate 62, and the fixing plate 62 is fixed to the drive link 61 by a cable fixing bolt 63. Thus, when the first front shifting lever 24 or second front shifting lever 26 is operated, the drive link 61 constituting the four-node link mechanism of the front derailleur can be operated.

In this embodiment, when either of the first front shifting lever 24 or second front shifting lever 26 is operated, it is not possible to effect shifting with a shifting ratio higher than that because the drive link 61 cannot be returned, i.e., is in a pulled state, when either one of the shifting control devices is being operated. To avoid this, the lever that is not being used should be in the lowest shifting ratio, such as the low L position. Thus, for example, before the first front shifting lever 24 is operated, the second front shifting lever 26 should placed in the low L position initially. Thereafter, when the first front shifting lever 24 of the first front shifting control device 9 is operated, the wire 59 inside the cable 25 is pulled, driving the drive link 61. This, in turn, allows the front derailleur to be operated, transferring the sprocket chain (not shown) to effect shifting. The second front shifting lever 26 of the second front shifting control device 16 can be similarly operated, but in that case, the first front shifting lever 24 should initially be in the low L position.

Figure 9A:
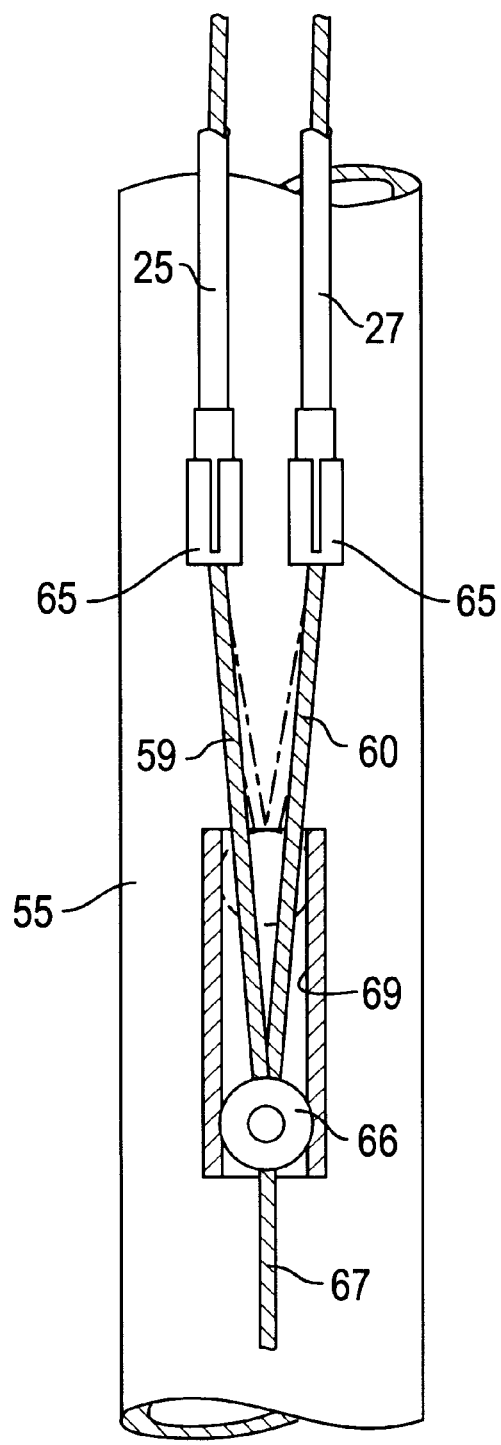
FIGS. 9A–9B depict an alternative embodiment of a structure for fixing the cables and wires of a corresponding pair of the shifting control devices shown in FIG. 1.
Figure 9B:
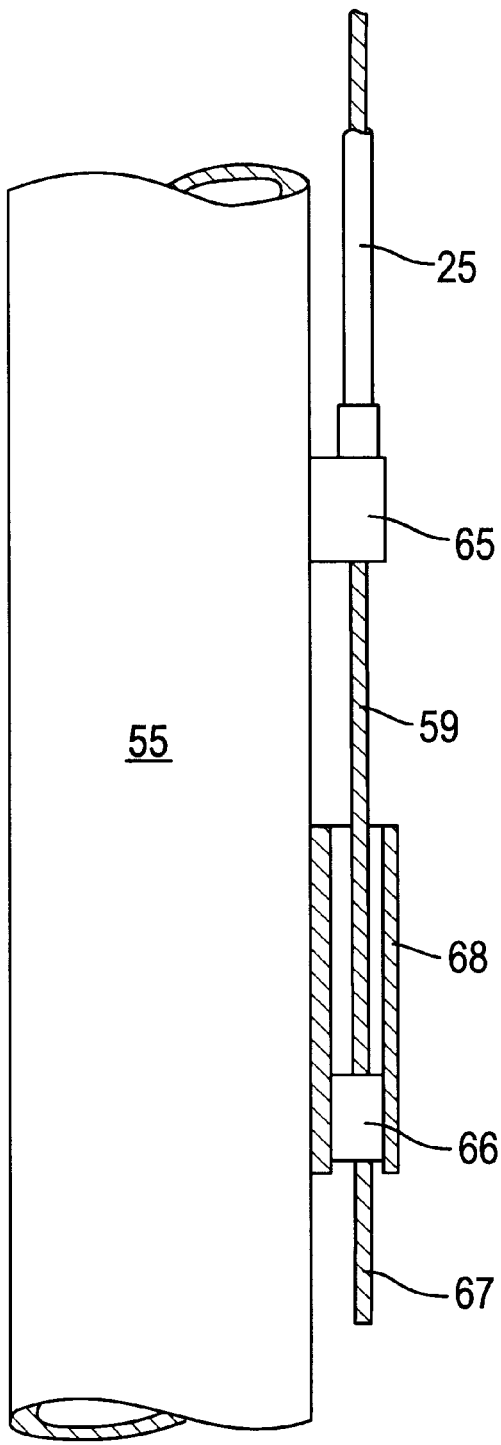

FIGS. 9a and 9b are front and side cross sections of a second method for fixing the cables 59,60 to the front derailleur. As shown therein, two cable receivers, 65 are fixed by welding to the vertical frame 55, and holes are provided at the bottoms to pass wires through. Cable caps for the cables 25 and 27 are inserted into the cable receivers 65 and 65 to support them.

One end each of the wire 59 of the cable 25 and of the wire 60 of the cable 27 is connected to a joint 66. The joint 66 is further connected to one end of a wire 67, while the other end of the wire 67 is fixed to the drive link 61 that drives the front derailleur. The joint 66 is formed in the shape of a cylinder and is slidably inserted within a guide face 69 of a guide 68.

When the first front shifting lever 24 of the first front shifting control device 9 is operated, the wire 59 inside the cable 25 is pulled. When the wire 59 is thus pulled, the joint 66 is guided inside the guide 68, and the joint 66 is moved up and down. The up and down movement of this joint 66 pulls and releases the wire 67 for controlling drive link 61 and thus operating the front derailleur.

Figure 10:
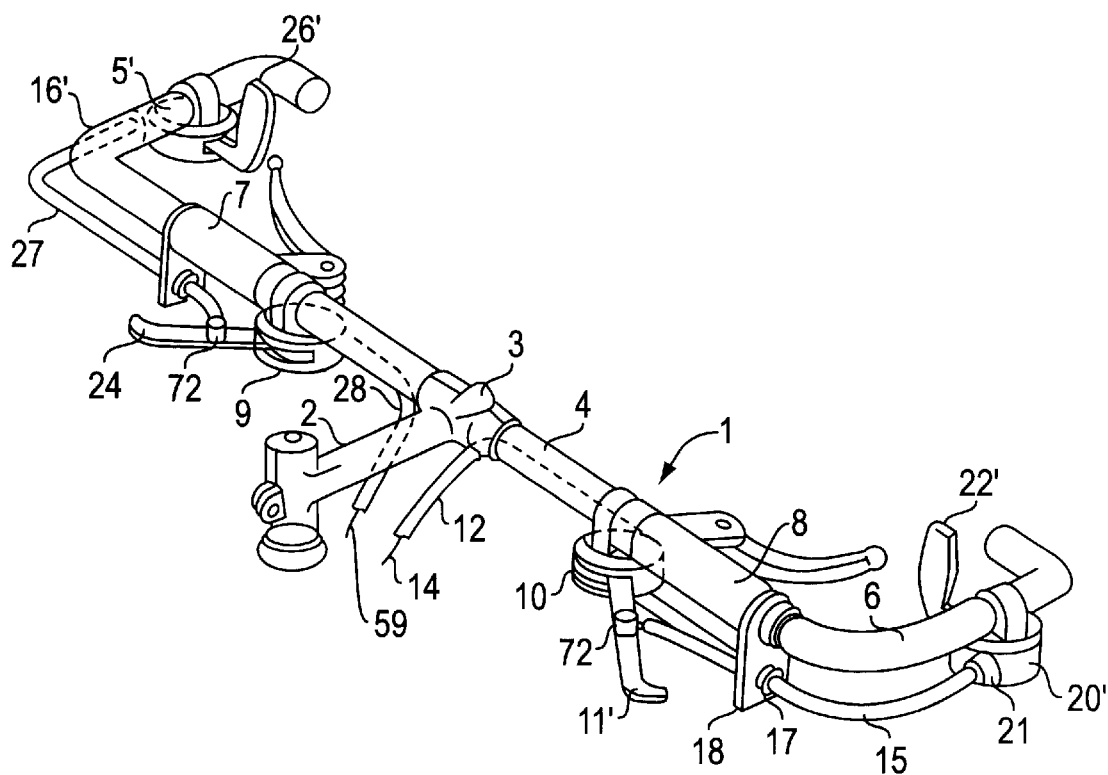
FIG. 10 is an oblique view of handle bars provided with an alternative embodiment of a bicycle shifting control mechanism according to the present invention.

FIG. 10 is an oblique view of handle bars provided with an alternative embodiment of a bicycle shifting control mechanism according to the present invention. Structures which are the same as those shown in FIG. 1 are numbered the same. In this embodiment, one end of wire 13 of cable 15 is connected with a ball joint 72 to the intermediate section of the shifting control lever 11'. Similarly, one end of wire 60 of a cable 27 is connected with a ball joint 72 to the intermediate section of the shifting control lever 24'. The ball joint 72 is a well known structure in which a socket having a shape encompassing the spherical end of each wire 13,60 is fixed on the shifting control levers 11',24', thus allowing the wires 13,60 and the shifting control levers 11',24' to be connected no matter what the angle of the shifting control levers.

Figure 11:
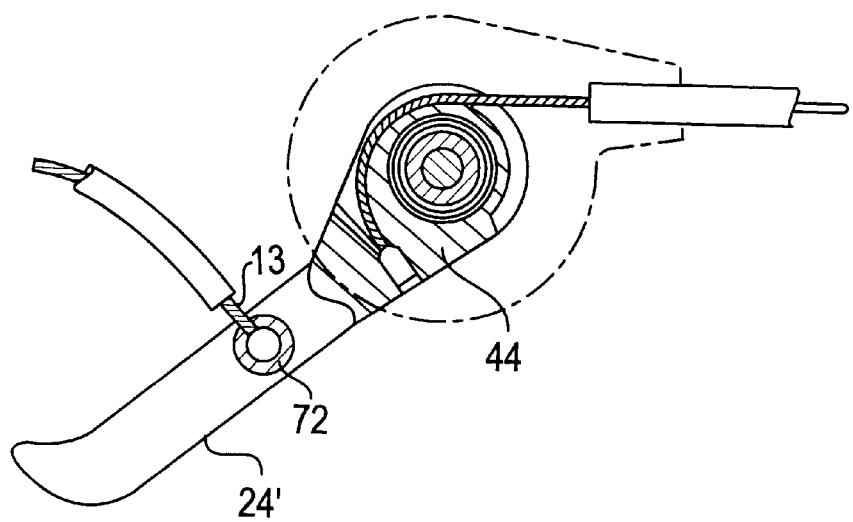
FIG. 11 is a partial cross sectional view of a shifting lever similar to the shifting lever shown in FIG. 4, but with a particular embodiment of a cable connector according to the embodiment shown in FIG. 10.

First front shift control device 9 and first rear shift control device 10 are constructed the same as in FIG. 1 with the exception of the provision of ball joint 72 on shift control levers 11' and 24'. FIG. 11 is a cross section of first front shift control lever 11' showing the structure of ball joint 72. Furthermore, in this embodiment wire 59 is connected directly to the front derailleur, and wire 14 is connected directly to the rear derailleur.

Figure 12:
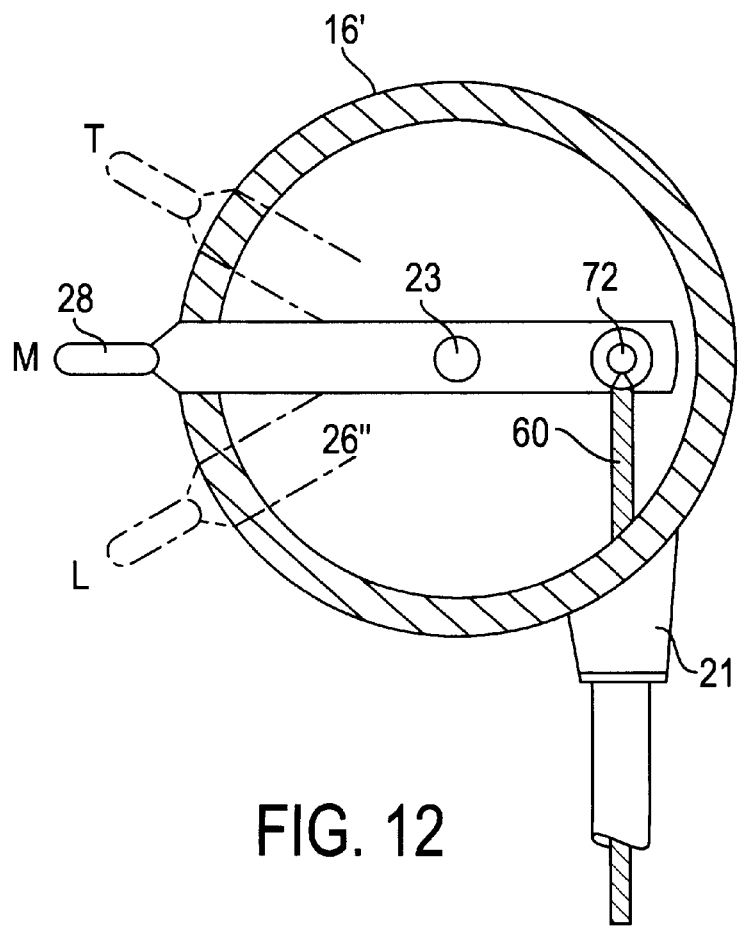
FIG. 12 is a cross sectional view of a particular embodiment of a shift control device which may be used in the embodiment shown in FIG. 10.

FIG. 12 is a partial cross sectional view of a particular embodiment of second front shift control device 16'. Second rear shift control device 20' is constructed the same way. In this embodiment, shifting control lever 26' can be rocked, pivoting on a central shaft 23 in the center position of the interlocking lever case 20. One end of cable 60 is connected by means of a ball joint 72 to one end of the shifting control lever 26'. The other end of the shifting control lever 26' is provided with a tab 28 for manual operation that is bent in the shape of an L. As may be seen by the drawing, operating the shifting control lever 26' allows the cable 60 to be operated and allows the shifting control lever 26' to be interlocked with shifting control lever 24', so that shifting can be controlled by either the shifting control lever 26' or the shifting control lever 24'.

Figure 13:
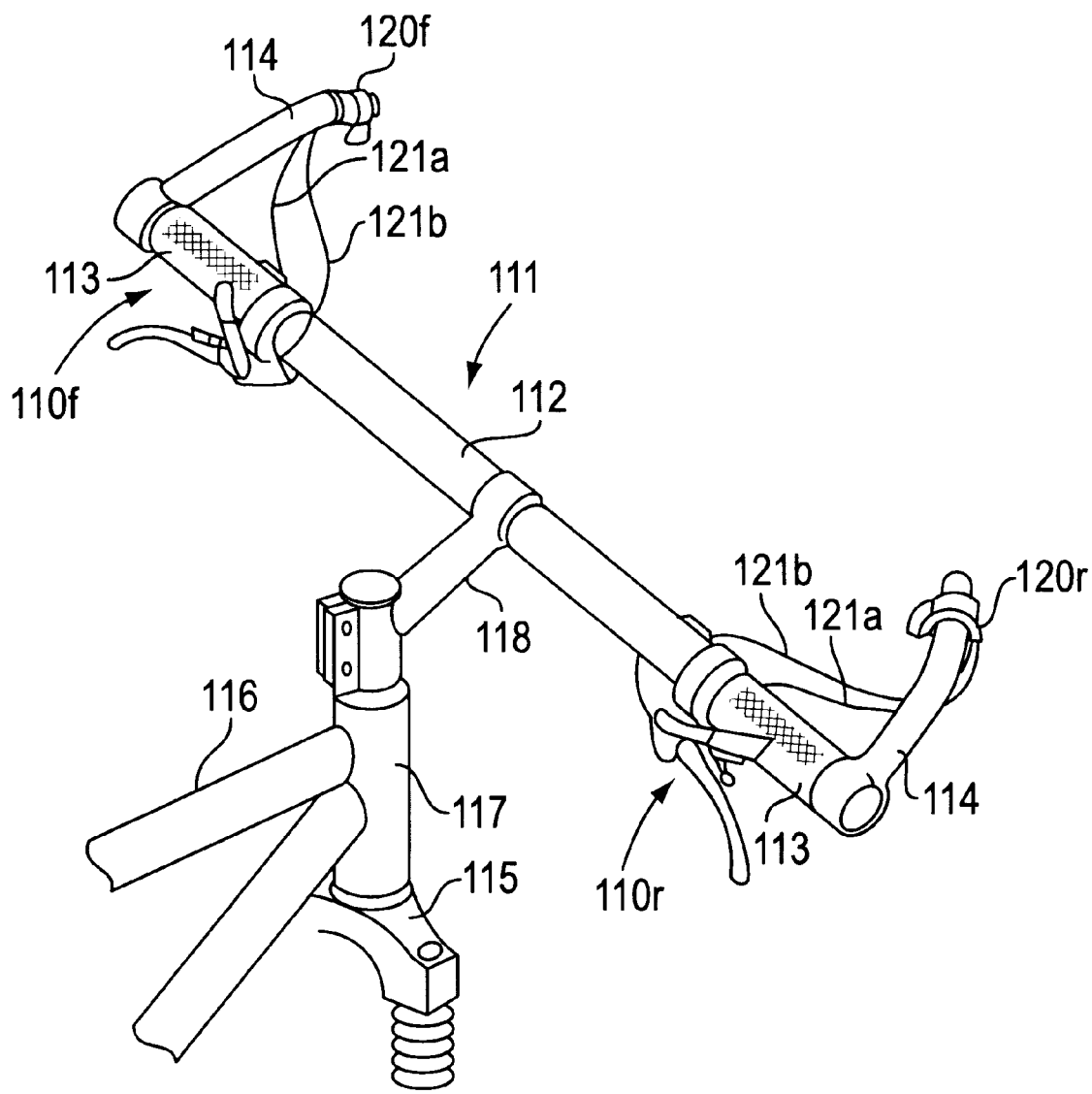
FIG. 13 is an oblique view of handle bars provided with another alternative embodiment of a bicycle shifting control mechanism according to the present invention.

FIG. 13 is an oblique view of handle bars provided with another alternative embodiment of a bicycle shifting control mechanism according to the present invention. In FIG. 13, main shift control devices 110f and 110r pertaining to an embodiment of the present invention are mounted on both ends of a main bar 112 that extends to the left and right of a handlebar 111. In addition to the main shift control devices 110f and 110r, grips 113 are mounted to the outside thereof on the main bar 112. Bar ends 114 that make up part of the handlebar 111 are mounted to the outside of the grips 113. The bar ends 114 are mounted facing forward and upward on the ends of the main bar 112. The main bar 112 is attached to the distal end of a stem 118. The base end of the stem 118 is mounted to the upper end of a suspension fork 115 such that it sandwiches the head component 117 at the distal end of a bicycle frame 116.

Auxiliary shift control devices 120f and 120r that are used for the remote operation of the front and rear main shift control devices 110f and 110r are mounted to the distal ends of the bar ends 114. These auxiliary shift control devices 120f and 120r are linked to the main shift control devices 110f and 110r by two control cables 121a and 121b, respectively.

Figure 14:
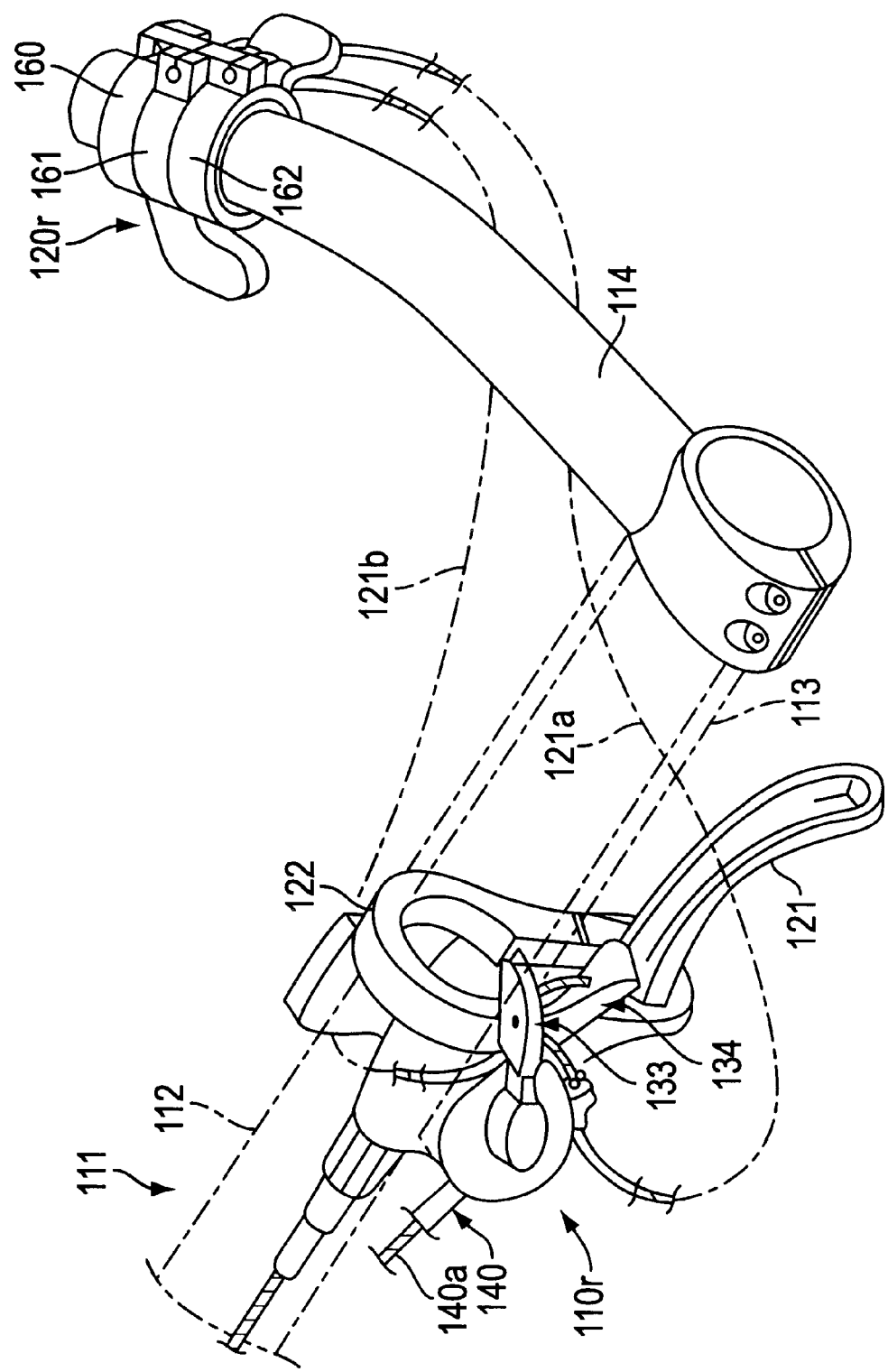
FIG. 14 is an oblique detailed view of the left side of the handlebar shown in FIG. 13.
Figure 15:
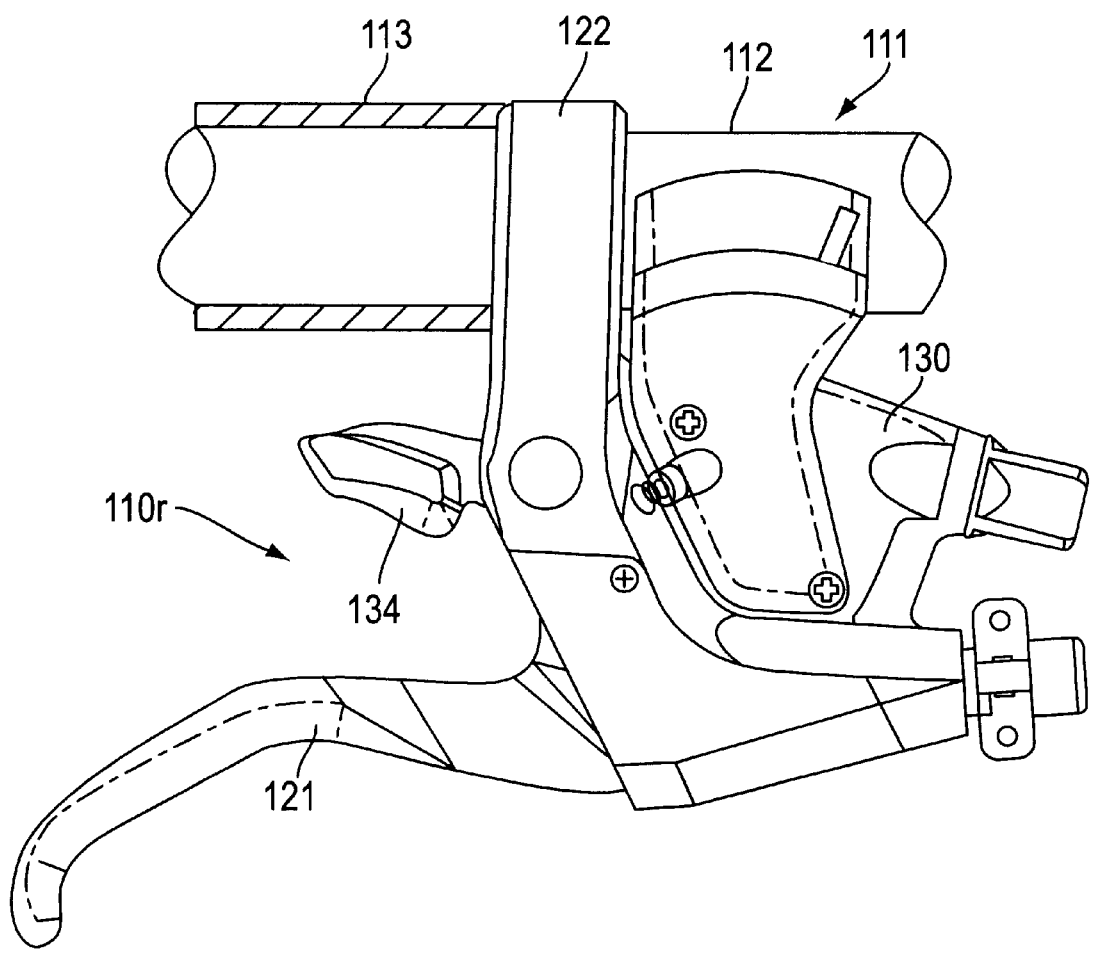
FIG. 15 is a front view of a first shifting control device shown in FIG. 13.
Figure 16:
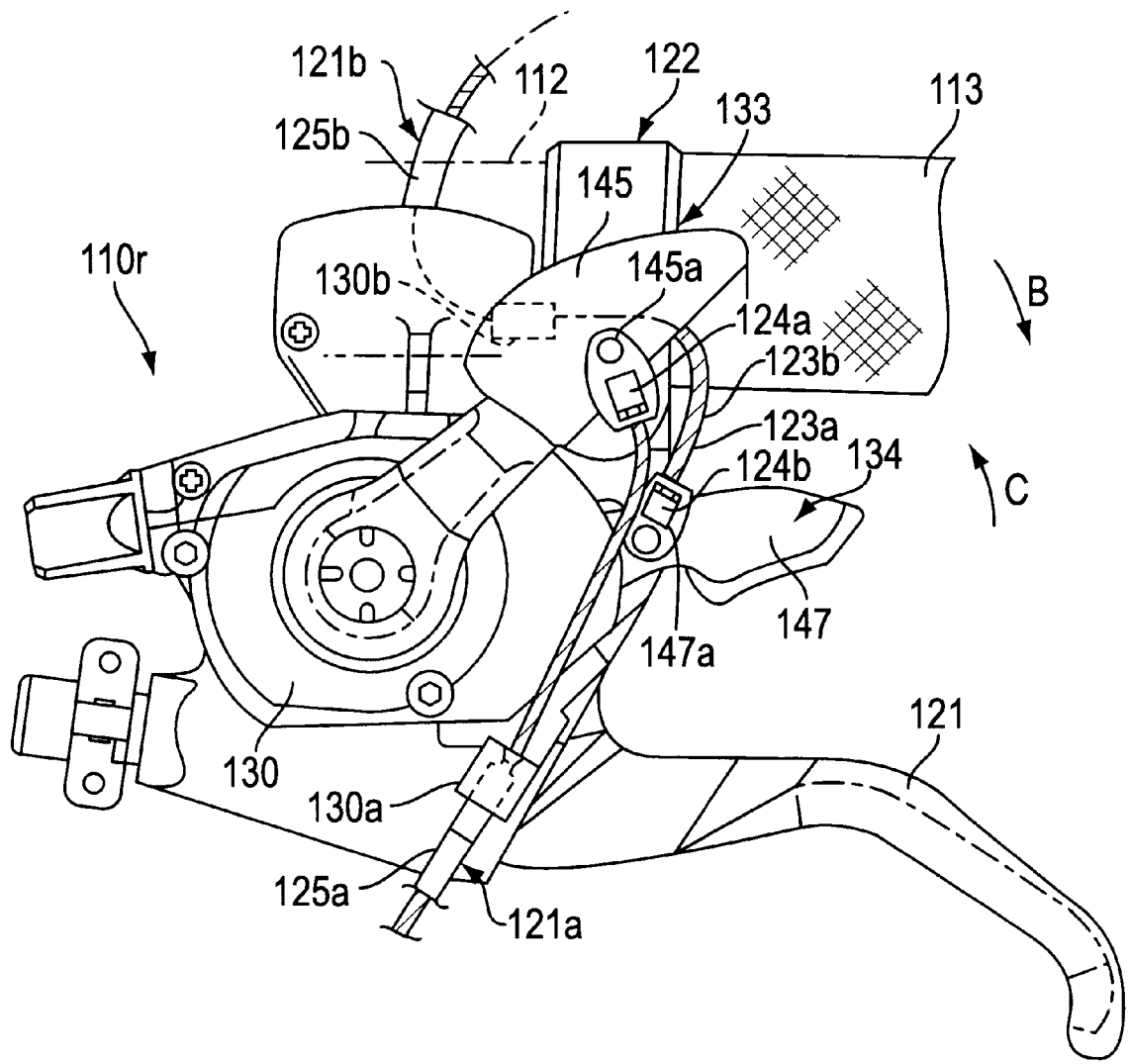
FIG. 16 is a rear view of a first shifting control device shown in FIG. 13.
Figure 17:
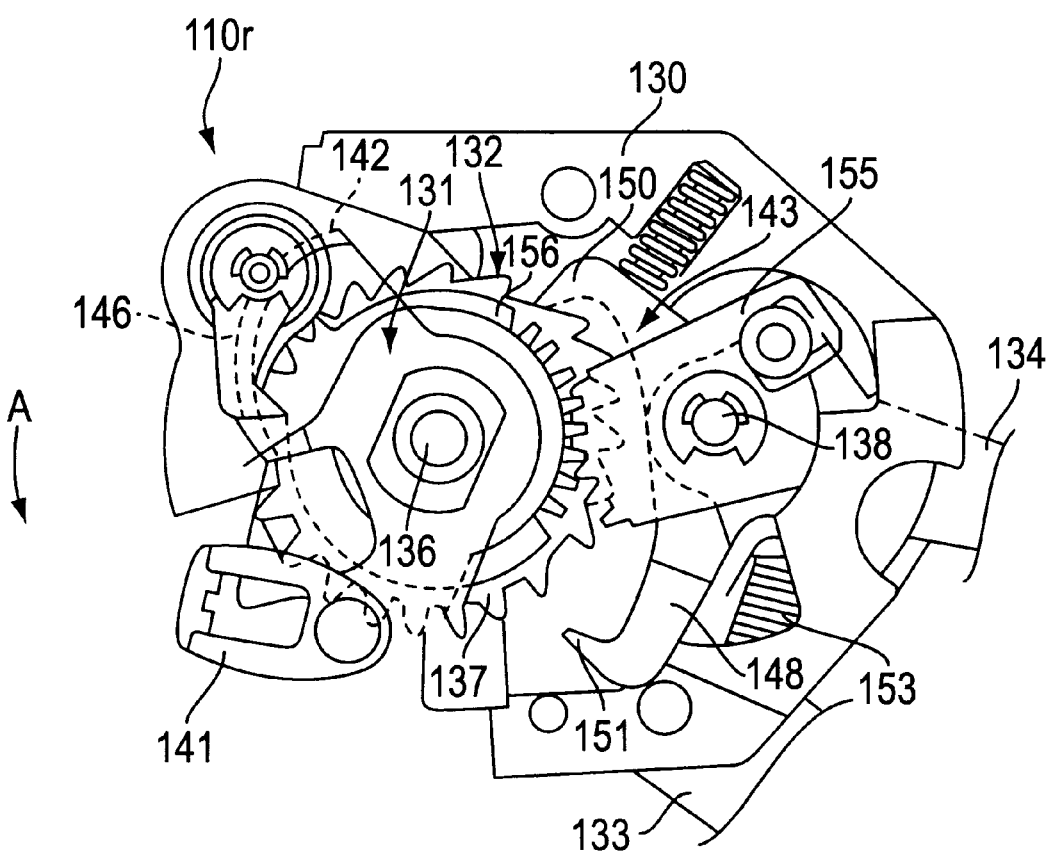
FIG. 17 is an internal view of the first shifting control device shown in FIG. 13.
Figure 18:
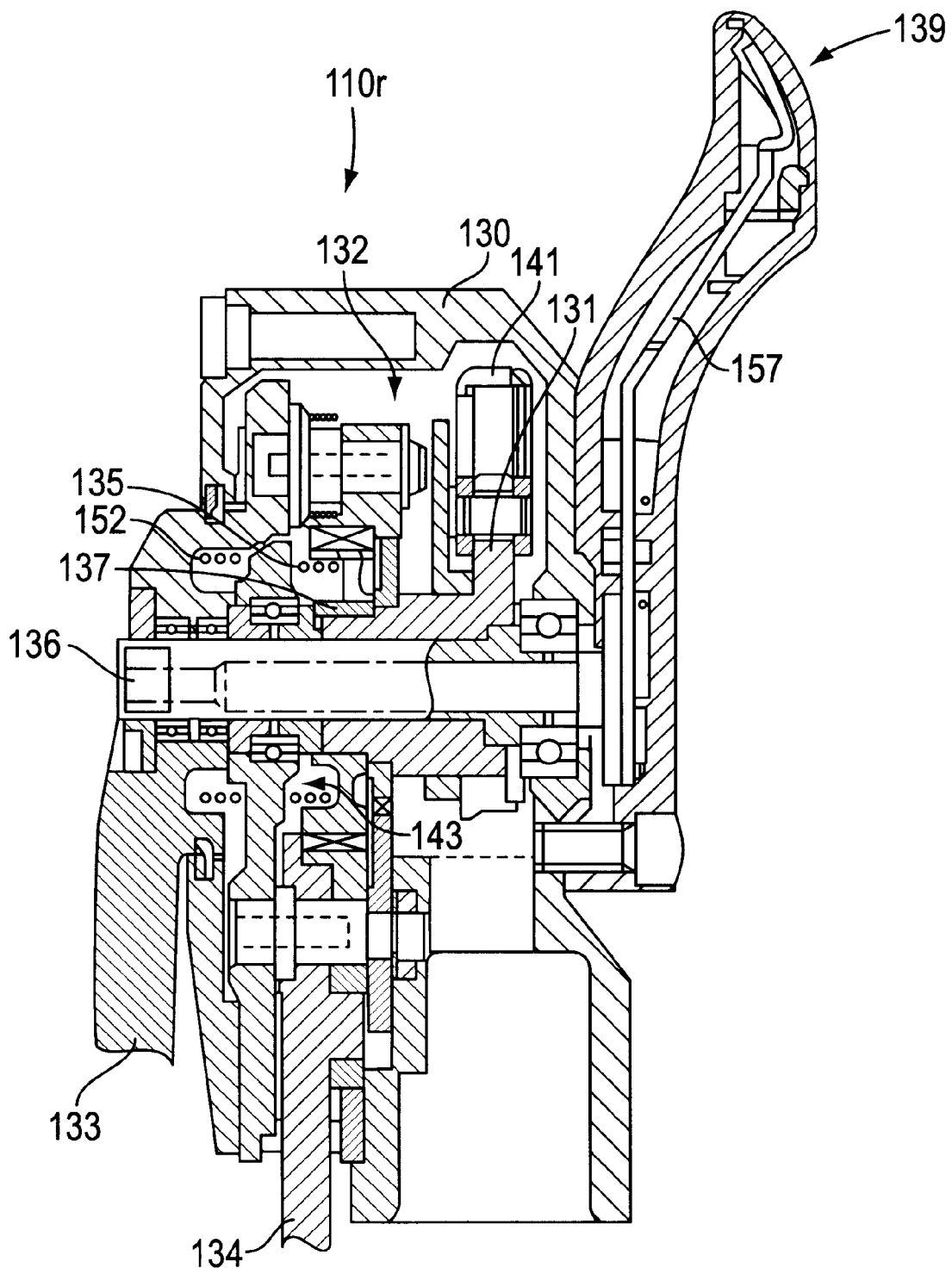
FIG. 18 is an internal cross sectional view of the first shifting control device shown in FIG. 13.

As shown in FIGS. 14 through 16, the main shift control devices 110f and 110r are integrated with brake levers 121, and they are mounted underneath the main bar 112 via brake brackets 122 that swingably support the brake levers 121. The main shift control device 110r, which is used for rear shifts, will be described below.

As shown in FIGS. 15 through 18, the main shift control device 110r comprises a main control bracket 130 that is formed integrally with a brake bracket 122; a winder 131 that is positioned in the interior of the main control bracket 130 and is rotatably supported by the main control bracket 130; a positioning mechanism 132 for setting the rotational position of the winder 131 in stages; a first shift lever 133 that is used to operate the winder 131 rotationally; a release mechanism 143 for releasing the setting of the rotational position of the winder 131; and a torsion coil spring 135 for energizing the winder 131 in the opposite direction from the winding direction. The main shift control device 110r also has a display 130 for displaying the rotational position.

The winder 131 has a shift cable stopping component 141 that is used to stop the inner cable 140a of a shift cable (FIG. 14) connected to a rear derailleur (not shown). The winder 131 also has around its periphery a cable guide 142 that guides the wound inner cable 140a. The winder 131 is fixed to a rotating shaft 136 rotatably supported by a bearing on the main control bracket 130. Also fixed to the winder 131 is a shift gear 137 that constitutes the positioning mechanism 132 and on the peripheral surface of which are formed serrated feed teeth and positioning teeth.

The first shift lever 133 is rotatably mounted to the rotating shaft 136. The first shift lever 133 is energized in the opposite direction from the operation direction by a torsion coil spring 152. A control component 145 is formed at the distal end of the first shift lever 133. A feed pawl 146 is rotatably mounted at a point where the first shift lever 133 is positioned inside the main control bracket 130. The feed pawl 146 is energized such that its distal end can come into contact with the feed teeth of the shift gear 137. When this first shift lever 133 is rotated in the direction of arrow A in FIG. 17, the feed pawl 146 engages with the feed teeth, the shift gear 137 is engaged, and the winder 131 is rotated in the winding direction.

The second shift lever 134 has a control component 147 on its distal end. The second shift lever 134 is energized in the opposite direction from the operation direction by a spring 153. The second shift lever 134 is rotatably supported on a rotating shaft 138 embedded in the main control bracket 130. A release pawl 150 and a positioning pawl 151, which are actuated in conjunction with the second shift lever 134, and which constitute the release mechanism 143, are provided at the rotational center of the second shift lever 134. The release pawl 150 and positioning pawl 151 position the winder 131 by selectively stopping the positioning teeth formed on the peripheral surface of the shift gear 137. The release pawl 150 is energized in the direction of the shift gear 137 by a spring 154, the state of stoppage to the shift gear 137 is released by rotational actuation of the second shift lever 134, and the positioning pawl 151 is stopped to the shift gear 137 simultaneously with this release. When the second shift lever 134 returns to its original position as a result of its energization by the spring 152, the release pawl 150 is stopped to the positioning teeth of the shift gear 137, and the winder 131 is positioned in a state in which the inner cable has been played out by one tooth of the positioning teeth. The positioning pawl 151 comes out at this point.

A feed pawl release mechanism 155 that works in conjunction with the second shift lever 134 is provided at the rotational center of the second shift lever 134. The feed pawl release mechanism 155 rotates a feed pawl release gear 156, which is rotatably supported on the rotating shaft 136, according to the rotation of the second shift lever 134, and rotates the feed pawl 146 to the position where it disengages from the shift gear 137.

The first shift lever 133 and second shift lever 134 rotate in opposite directions from one another. Specifically, in FIG. 16, the first shift lever 133 rotates in the direction of arrow B, while the second shift lever 134 rotates in the direction of arrow C. The positions after this rotation are close to each other. Inner cable stopping components 145a and 147a that stop the inner cables 123a and 123b of the control cables 121a and 121b are provided to the control component 145 of the first shift lever 133 and the control component 147 of the second shift lever 134, respectively. The inner cable stopping components 145a and 147a are designed to stop drums 124a and 124b fixed to the distal ends of the inner cables 123a and 123b. Outer stopping components 130a and 130b, which are used to stop the outer casings 125a and 125b of the control cables 121a and 121b, are provided to the main control bracket 130. The outer stopping component 130a is provided to the lower portion of the main control bracket 130 in FIG. 16, and the outer stopping component 130b is formed at the boundary between the brake bracket 122 and the main control bracket 130.

A display 139 has an indicator needle 157 mounted at the distal end of the rotating shaft 136. The indicator needle 157 is linked to one end of the rotating shaft 136, and rotates to display the shift position.

The auxiliary shift control devices 120f and 120r will now be described. The following description will be for the auxiliary shift control device 120r linked to the main shift control device 110r for rear shifting.

Figure 19:
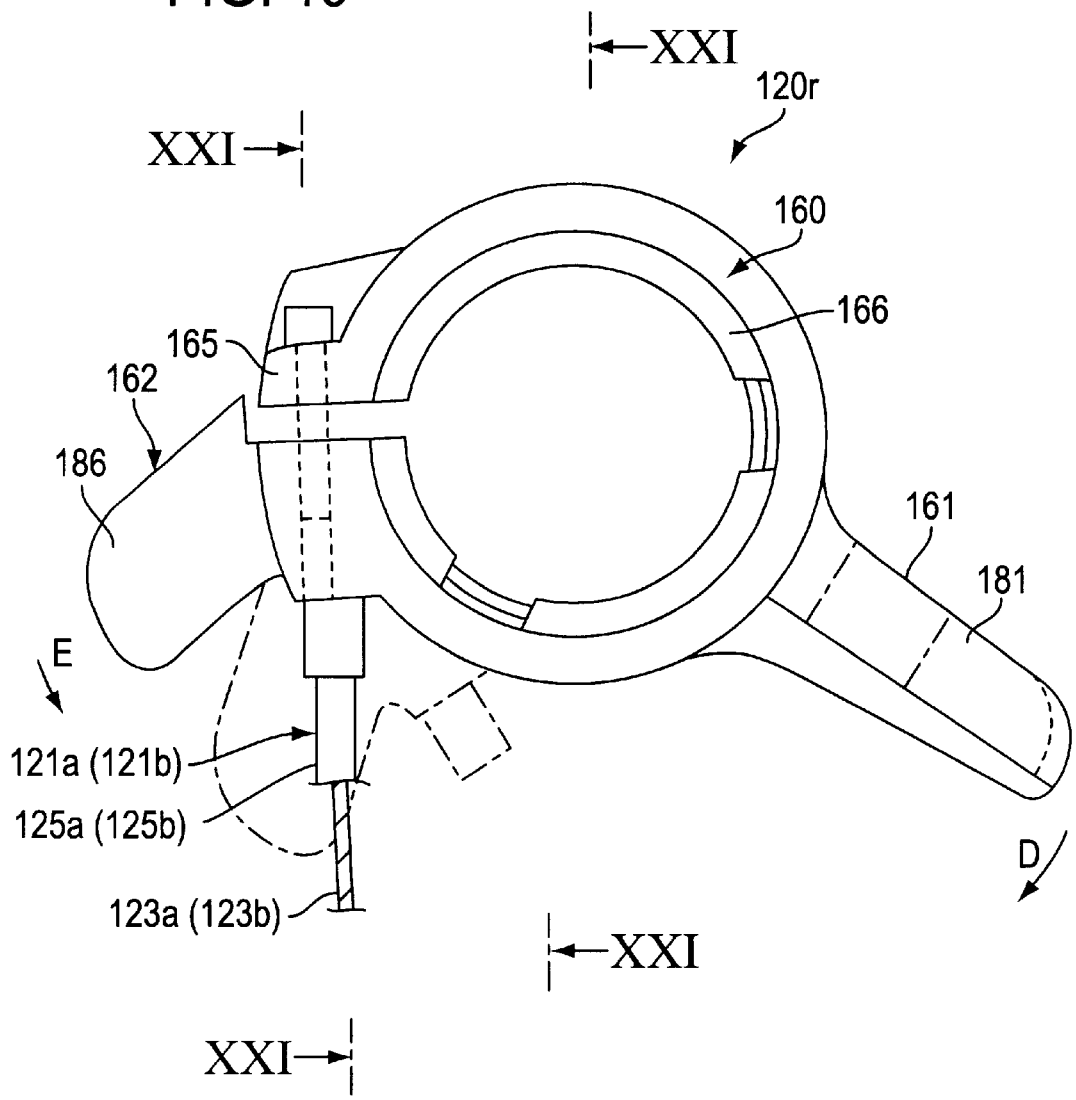
FIG. 19 is a side view of a second shifting control device shown in FIG. 13.
Figure 20:
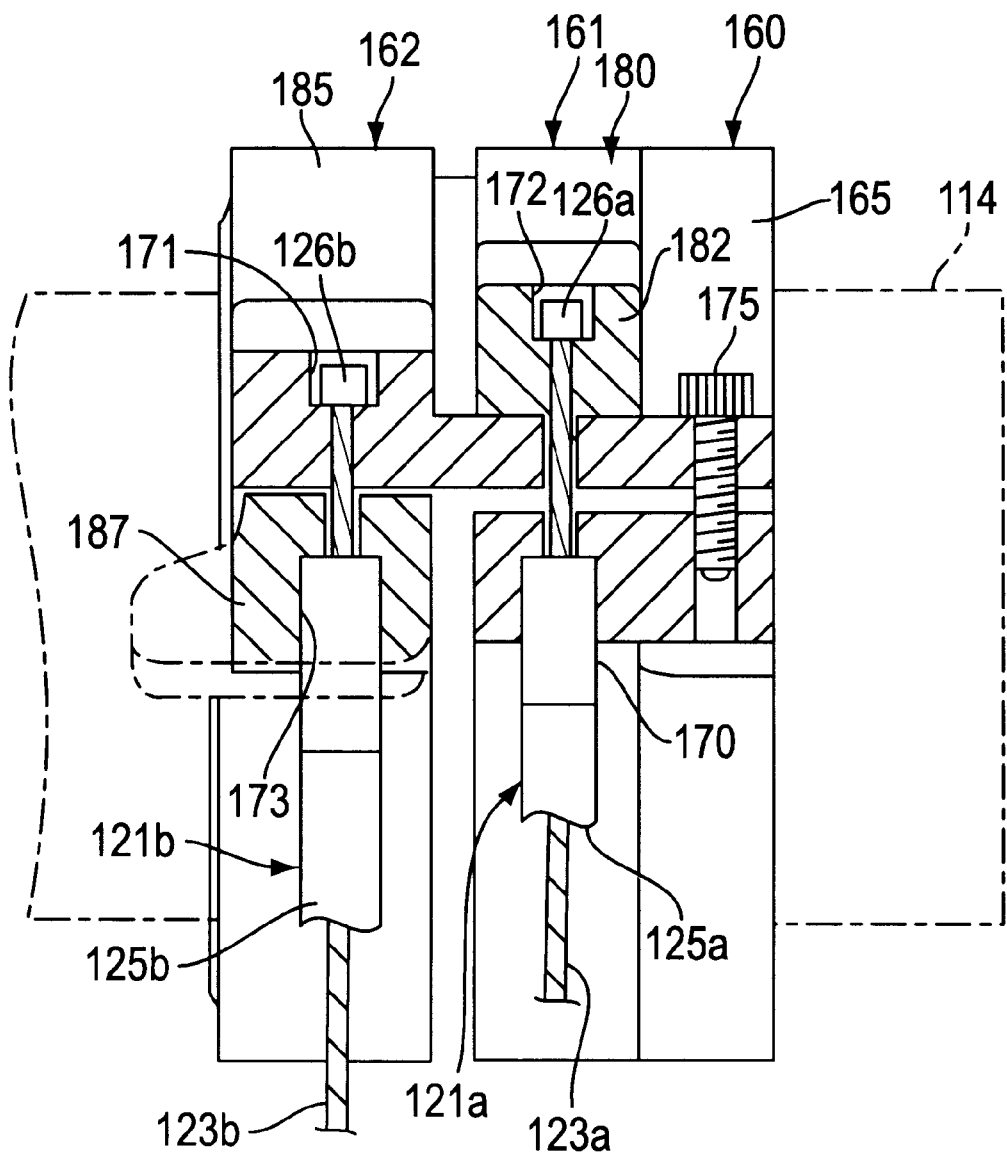
FIG. 20 is a view taken along line XX—XX in FIG. 19.
Figure 21:
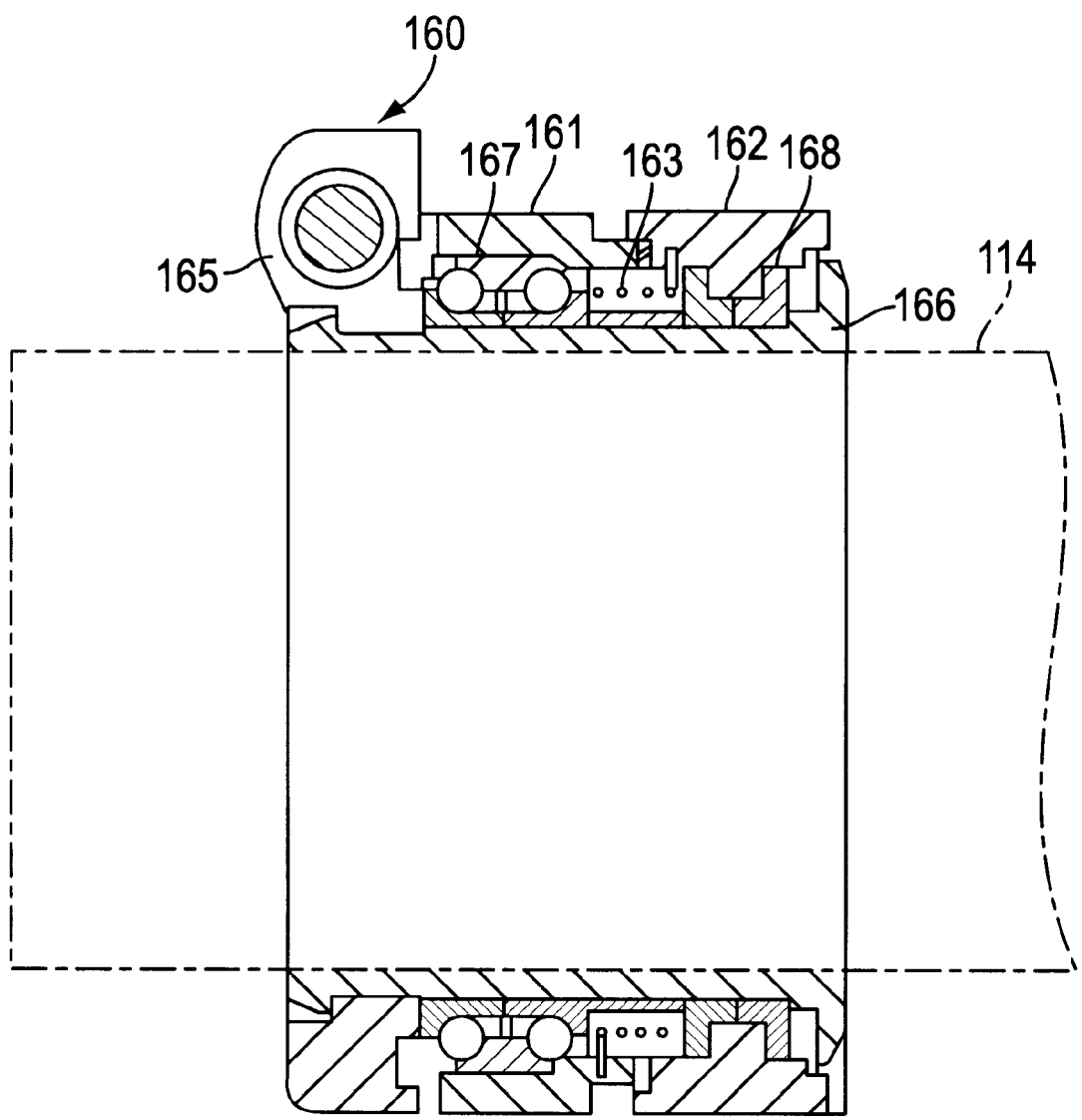
FIG. 21 is a view taken along line XXI—XXI in FIG. 19.

As shown in FIGS. 19 to 21, the auxiliary shift control device 120r comprises an auxiliary control bracket 160 mounted to the distal end of the bar end 114 that makes up part of the handlebar 111, a first auxiliary shift lever 161 rotatably supported by the auxiliary control bracket 160, a second auxiliary shift lever 162 rotatably supported by the auxiliary control bracket 160 next to the first auxiliary shift lever 161, and a torsion coil spring 163 that is used to return these auxiliary shift levers 161 and 162 to specific positions.

The auxiliary control bracket 160 has a ring-shaped fastening component 165 that has a groove formed in its radial direction, and a tube 166 that is fixed to the bar end 114 by the fastening component 165. A bearing 167 is installed around the outer periphery of the tube 166, and the first auxiliary shift lever 161 is rotatably supported via this bearing 167. A bushing 168 is installed around the outer periphery of the tube 166 at a distance from the bearing 167 in the axial direction, and the second auxiliary shift lever 162 is rotatably supported by the bushing 168. A return-use torsion coil spring 163 is installed in a twisted state between the bearing 167 and the bushing 168. One end of the torsion coil spring 130 is stopped by the first auxiliary shift lever 161, and the other end is stopped by the second auxiliary shift lever 162. As a result, the first auxiliary shift lever 161 and the second auxiliary shift lever 162 are energized in opposite directions from one another (the play-out directions of the inner cables 123a and 123b). Here, since the two auxiliary shift levers 161 and 162 rotate in opposite directions, a single torsion coil spring 163 can serve as the two energization means for energizing the two levers 161 and 162.

As shown in FIG. 20, an outer stopping component 170 and an inner stopping component 171 that extend in the axial direction of the bar end 114 are formed in the fastening component 165. The outer stopping component 170 stops the distal end of the outer casing 125a of the control cable 121a. The inner cable 123a of this control cable 121a is stopped by an inner stopping component 172 formed on the peripheral surface of the first auxiliary shift lever 161. The inner stopping component 171 stops the drum 126b at the distal end of the inner cable 123b of the control cable 121b. The outer casing 125b of this control cable 121b is stopped by an outer stopping component 173 provided to the second auxiliary shift lever 162. The fastening component 165 is fastened to the bar end 114 by a fastening bolt 175.

The first auxiliary shift lever 161 has a ring component 180 and an auxiliary control component 181 that extends outward from the ring component 180 in the radial direction. A stopper 182 that strikes the fastening component 165 is provided to the outer peripheral surface of this ring component 180 such that it protrudes outward, and the inner stopping component 172 is formed at this stopper 182. This first auxiliary shift lever 161 is energized by the torsion coil spring 163 and is always disposed at the location where the stopper 182 strikes the fastening component 165.

The second auxiliary shift lever 162 has a ring component 185 and an auxiliary control component 186 that extends outward from the ring component 185 in the approximate radial direction. The auxiliary control component 186 is formed on the opposite side from the auxiliary control component 181 with respect to the axial center. A stopper 187 is formed at the base of the auxiliary control component 186. The stopper 187 strikes the fastening component 165. The outer stopping component 173 is formed in this stopper 187. This second auxiliary shift lever 162 is energized by the torsion coil spring 163 and is always disposed at the location where the stopper 187 strikes the fastening component 165.

The actuation during a shift will now be described.

When the first shift lever 133 of the main shift control devices 110r and 110f is rotationally operated in the direction of arrow B in FIG. 16 (downward) by the thumb, for example, the winder 131 is rotated in the winding direction (the direction of arrow A in FIG. 17) by the feed pawl 146. As a result, the inner cable 140a of the shift cable 140 is pulled, and the front derailleur or rear moves upward, for example. In the case of a front derailleur, the chain guide of the front derailleur moves from a smaller diameter gear toward a larger diameter gear and from the inner cable toward the outer casing. In the case of a rear derailleur, chain guide of the rear derailleur moves from a smaller diameter gear toward a larger diameter gear and from the outer casing toward the inner cable. When the feed pawl 146 moves the winder 131, the release pawl 150 restricts the rotation of the winder 131 in the line play-out direction at the point when the rotation comes to a halt, while stopping the positioning teeth of the shift gear 137 by one tooth at a time. The winder 131 is positioned rotationally by one stage at a time by this release pawl 150.

Meanwhile, when the first auxiliary shift lever 161 of the auxiliary shift control devices 120f and 120r is rotationally operated in the direction of arrow D) in FIG. 19 by the thumb, for example, the inner cable 123a of the control cable 121a is pulled and moves in the direction of arrow B in FIG. 16, just as when the first shift lever 133 was operated by the thumb. As a result, the inner cable 140a of the shift cable 140 is pulled in the same manner as that described above.

When the second shift lever 134 is rotationally operated in the direction of arrow C by the index finger, for example, the release pawl 150 retracts from the shift gear 137, and at the same time the positioning pawl 151 strikes the shift gear 137. As a result, the winder 131 is halted in a state in which it has rotated slightly in the line play-out direction. At this point, the feed pawl 146 is also retracted from the shift gear 137 by the feed pawl release mechanism 154. When the second shift lever 134 is returned to its home position by the spring 152 in this state, the positioning pawl 151 retracts from the shift gear 137, the release pawl 150* is stopped by the tooth on the upstream side in the line play-out direction of the shift gear 137, and the winder 131 rotates by one tooth in the line play-out direction. As a result, the inner cable 140a of the control cable 140 is played out by one shift step, and the derailleur moves downward. In the case of a front derailleur, for instance, the chain guide moves from a larger gear to a smaller gear and from the outer casing to the inner cable, and in the case of a rear derailleur, the chain guide moves from a larger gear to a smaller gear and from the inner cable to the outer casing.

Meanwhile, when the second auxiliary shift lever 162 of the auxiliary shift control devices 120f and 120r is operated in the direction of arrow E in FIG. 19 by the index finger, for example, the outer casing 125b of the control cable 121b is pushed, and the inner cable 123*b* is relatively pulled. As a result, the second shift lever 134 rotates in the direction of arrow C in FIG. 16, the inner cable 140*a* of the shift cable 140 is played out by the above actuation, and a downshift is made.

Here, the shift control can be performed by either of the main shift control devices 110*f* and 110*r* and auxiliary shift control devices 120*f* and 120*r*. Furthermore, either of the shift control devices can be used to make a shift by repeating the same actuation from a given position, regardless of the shift step. Therefore, shift control can be performed easily and reliably from two handle positions.

Figure 22:
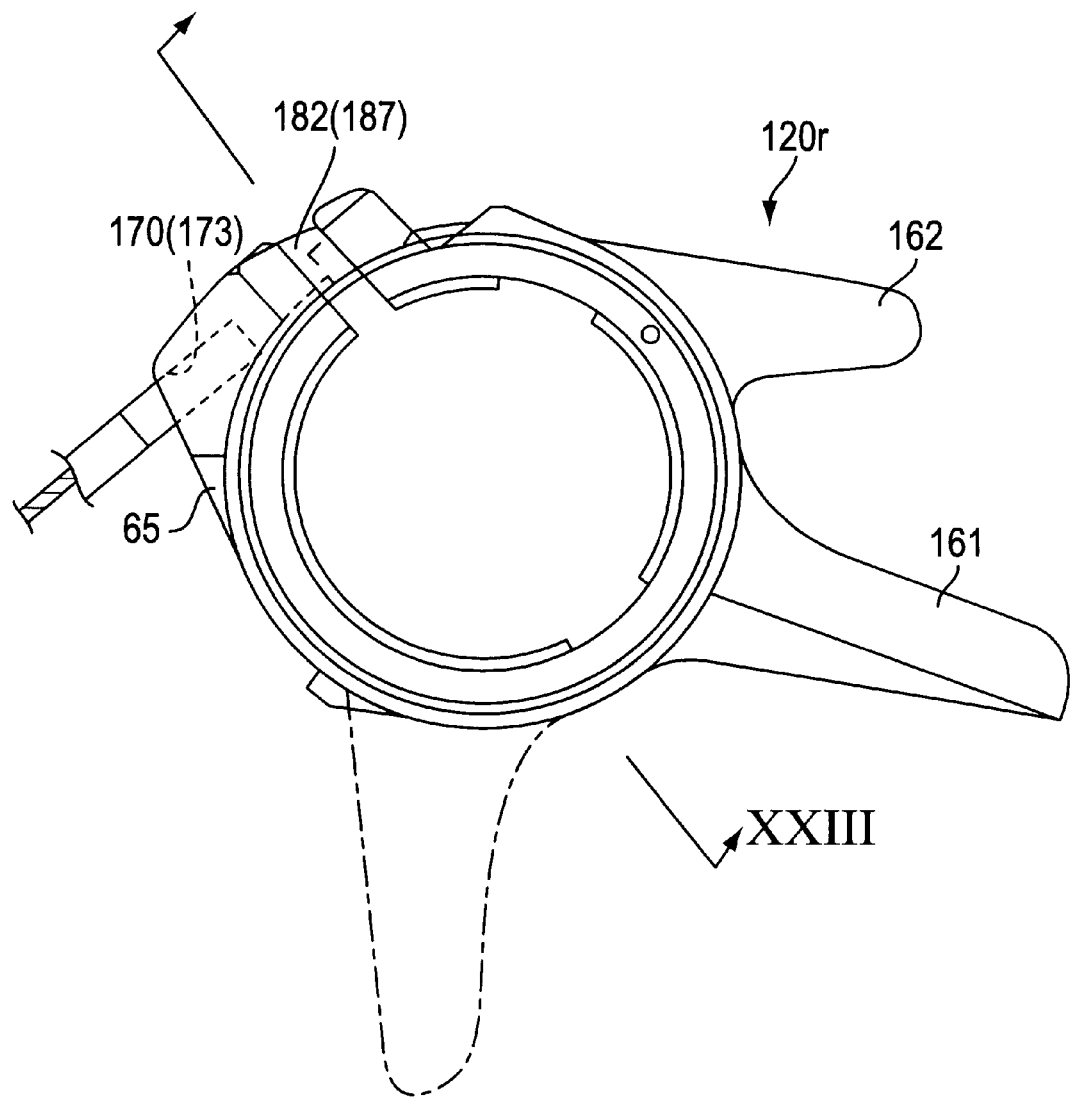
FIG. 22 is a side view of an alternative embodiment of a second shifting control device which may be used with the first shifting control device shown in FIG. 13.
Figure 23:
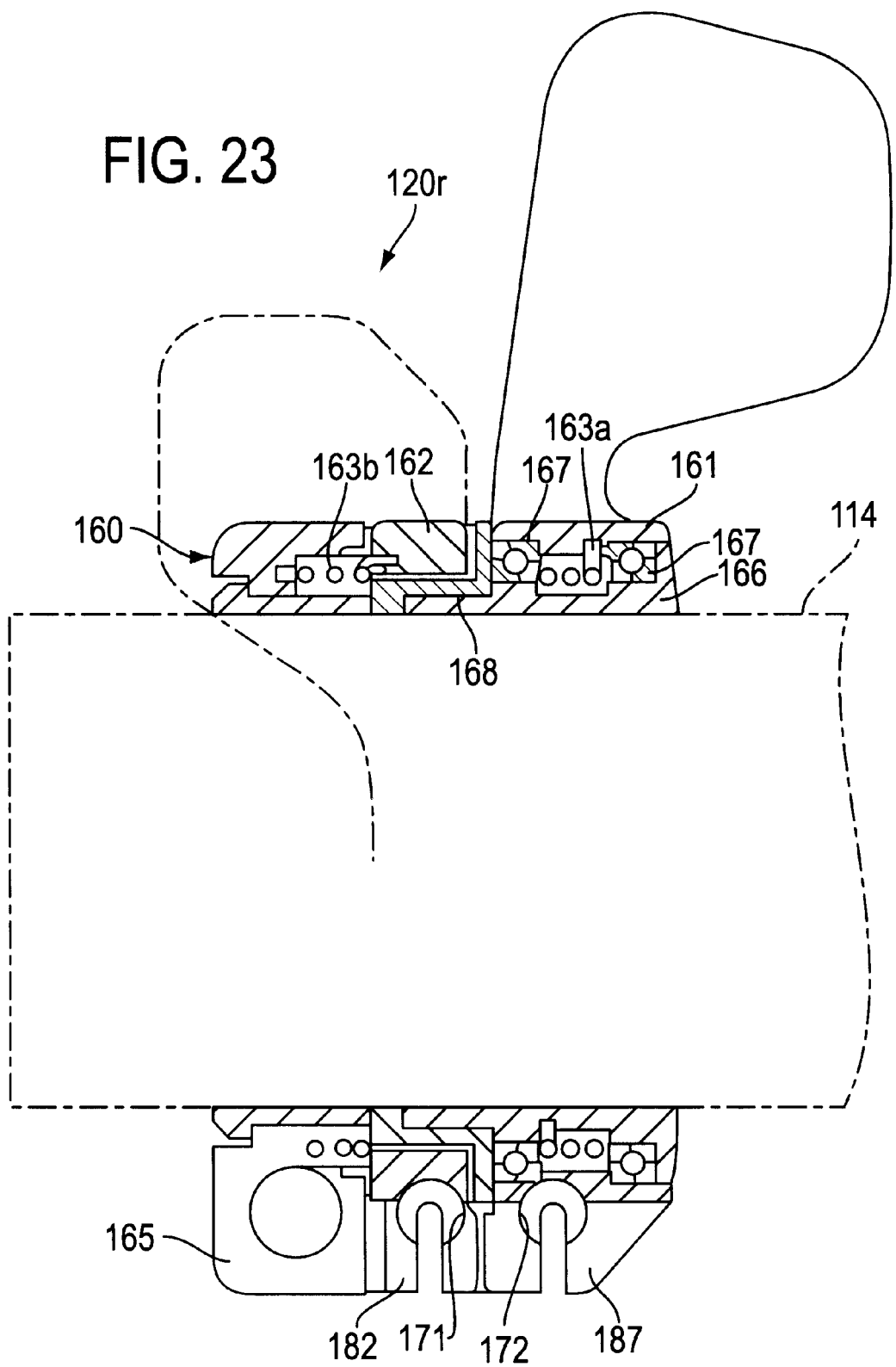
FIG. 23 is a view taken along line XXIII—XXIII in FIG. 22.

In the above embodiment, the auxiliary shift levers of the auxiliary shift control device were rotated in a different directions, but they may also be rotated in the same direction, as shown in FIGS. 22 and 23. The routing of the control cables 121*a* and 121*b* is easier in this case.

In this embodiment, the auxiliary shift control device 120*r* has an auxiliary control bracket 160, a first auxiliary shift lever 161, a second auxiliary shift lever 162, a first torsion coil spring 163*a* that is used to return the first auxiliary shift lever 161 to a specific rotational position, and a second torsion coil spring 163*b* that is used to return the second auxiliary shift lever 162 to a specific rotational position. The auxiliary control bracket 160 has a fastening component 165 and a tube 166 that is fastened by the fastening component 165. A bearing 167 is disposed at a distance on the outer peripheral side of the tube 166, and the first auxiliary shift lever 161 is rotatably supported on the tube 166 by this bearing 167. A bushing 168 is disposed at a distance from the bearing 167 on the outer peripheral side of the tube 166, and the second auxiliary shift lever 162 is rotatably supported on the tube 166 by this bushing 168.

With this structure, the first auxiliary shift lever 161 and the second auxiliary shift lever 162 are provided with stoppers 182 and 187, respectively, that each strike the fastening component 165, and these stoppers 182 and 187 are provided with the inner stopping components 171 and 172 that stop the inner cables 123*a* and 123*b* of the control cables 121*a* and 121*b*. The fastening component 165 is provided with two outer casing stopping components 170 and 173 that stop the outer casings 125*a* and 125*b*, respectively.

With a structure such as this, when the first auxiliary shift lever 161 is rotationally operated downward as shown by a broken line in FIG. 22, the first shift lever 133 rotates via the control cable 121*a*, and an upshift is made. Conversely, when the second auxiliary shift lever 162 is rotationally operated downward, the control cable 121*b* is operated, the second shift lever 134 is operated, and a downshift is made.

Figure 24:
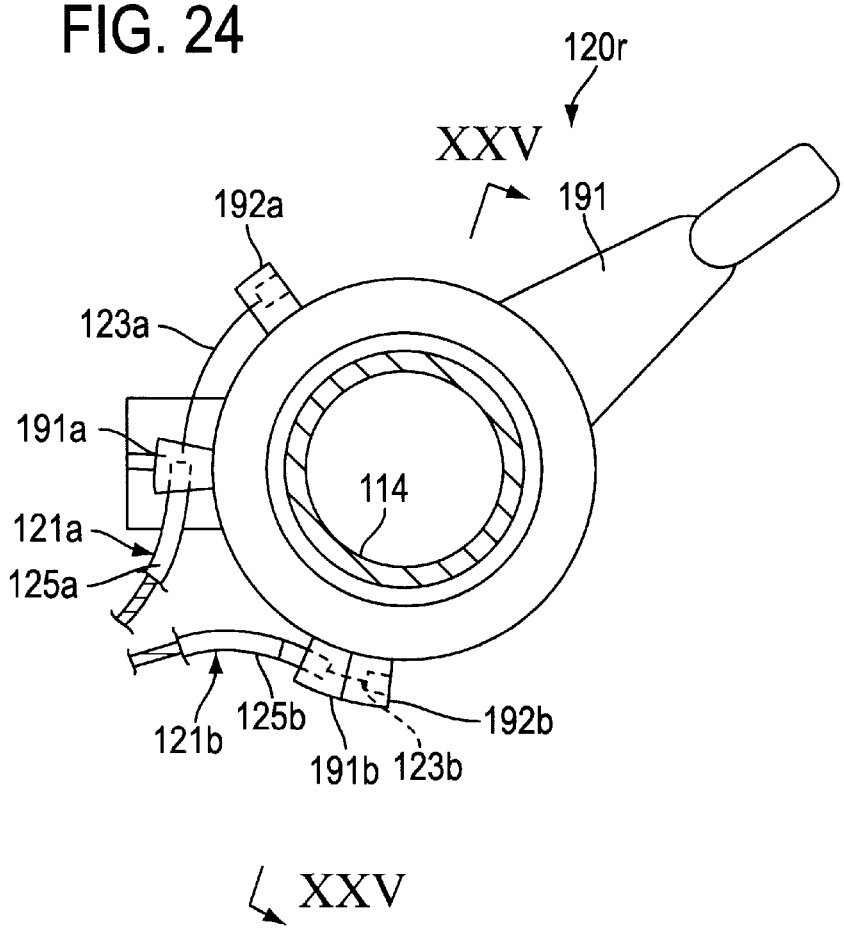
FIG. 24 is a side view of another alternative embodiment of a second shifting control device which may be used with the first shifting control de vice shown in FIG. 13.
Figure 25:
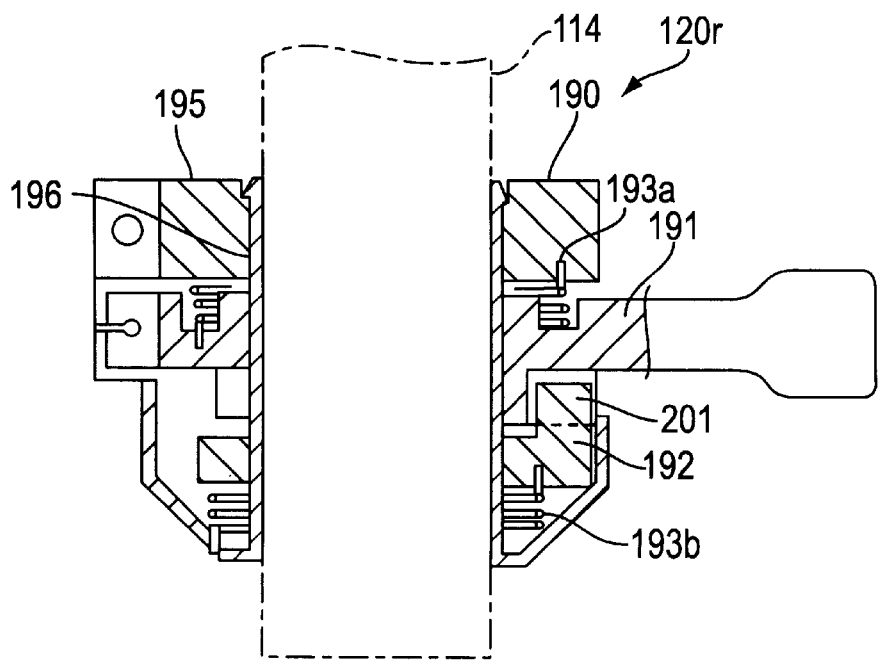
FIG. 25 is a view taken along line XXV—XXV in FIG. 24.
Figure 26:
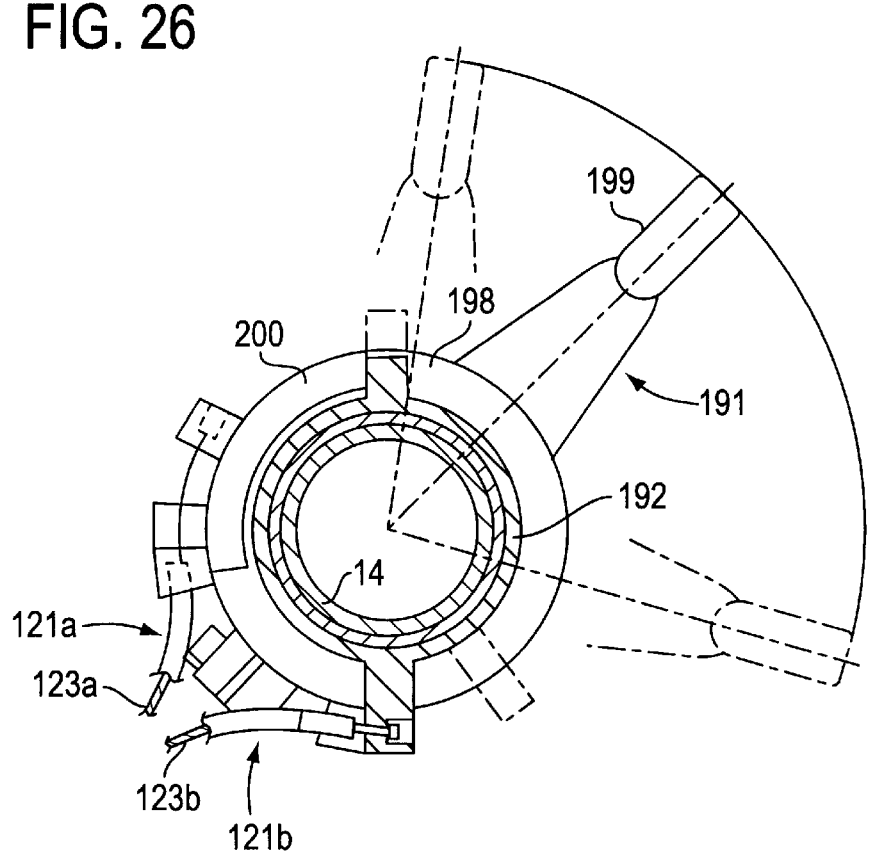
FIG. 26 is a view illustrating the operation of the second shifting control device shown in FIG. 24.

With the above embodiment, a shift was made in the auxiliary shift control device by means of two auxiliary shift levers, but in the following embodiment, the shift control is performed with a single auxiliary shift lever. As shown in FIGS. 24 to 26, this auxiliary shift control device 120*r* has a main control bracket 190, an auxiliary shift lever 191 that is rotatably supported on the main control bracket 190, a rotary member 192 that only rotates in conjunction with the rotation of the auxiliary shift lever 191 in one direction, a first torsion coil spring 193*a* that returns the auxiliary shift lever 191 to a specific position, and a second torsion coil spring 193*b* that returns the rotary member 192 to a specific position. The main control bracket 190 has a fastening component 195 and a tube 196 that is fastened by the fastening component 195. The lower end of the tube 196 in FIG. 25 is formed so as to cover the rotary member 192. The fastening component 195 has outer casing stopping components 191*a* and 191*b* that stop the outer casings of the two control cables 121*a* and 121*b*. The auxiliary shift lever 191 has an inner cable stopping component 192*a* that stops the distal end of the inner cable 123*a* of the control cable 121*a*. This inner cable stopping component 192*a* also functions as a stopper that strikes the fastening component 195. The rotary member 192 has an inner cable stopping component 192*b* that stops the distal end of the inner cable 123*b* of the control cable 123*b*. This inner cable stopping component 192*b* also functions as a stopper that strikes the fastening component 195.

The auxiliary shift lever 191 has a ring component 198 that is rotatably supported on the tube 196, and a control component 199 that extends from the ring component 198 in the radial direction. An engagement component 200 that is sunken lower than the other portions during a specific angle in the peripheral direction is formed on the rotary member 192 side of the ring component 198. An engagement protrusion 201 is formed around the outer periphery of the rotary member 192 toward this engagement component 200. As a result of the engagement of the engagement protrusion 201 and the engagement component 200, the range of rotation of the rotary member 192 is restricted, the rotary member 192 is energized at a specific position by the second torsion coil spring 193*b*, and further rotation is prohibited by the stopper, so the rotary member 192 only rotates in conjunction with the counterclockwise rotation (in FIG. 26) of the auxiliary shift lever 191, and does not rotate in conjunction with clockwise rotation.

With a structure such as this, when the auxiliary shift lever 191 is rotated clockwise from the specific position indicated by the solid lines in the figure, the rotary member 192 does not rotate, and only the auxiliary shift lever 191 rotates clockwise. As a result, the inner cable 123*a* of the control cable 121*a* is pulled and the first shift lever 133 is actuated. Conversely, when the auxiliary shift lever 191 is rotated counterclockwise from the specific position indicated by the solid lines, the inner cable 123*a*just goes slack and is not pulled, and the rotary member 192 rotates counterclockwise in conjunction with the rotation of the auxiliary shift lever 191. As a result, the inner cable 123*b* of the control cable 121*b* is pulled and the second shift lever 134 is actuated. With a structure such as this, an upshift or downshift can be made according to the rotational direction of the single control lever, so a shift can be made easily and reliably.

Figure 27:
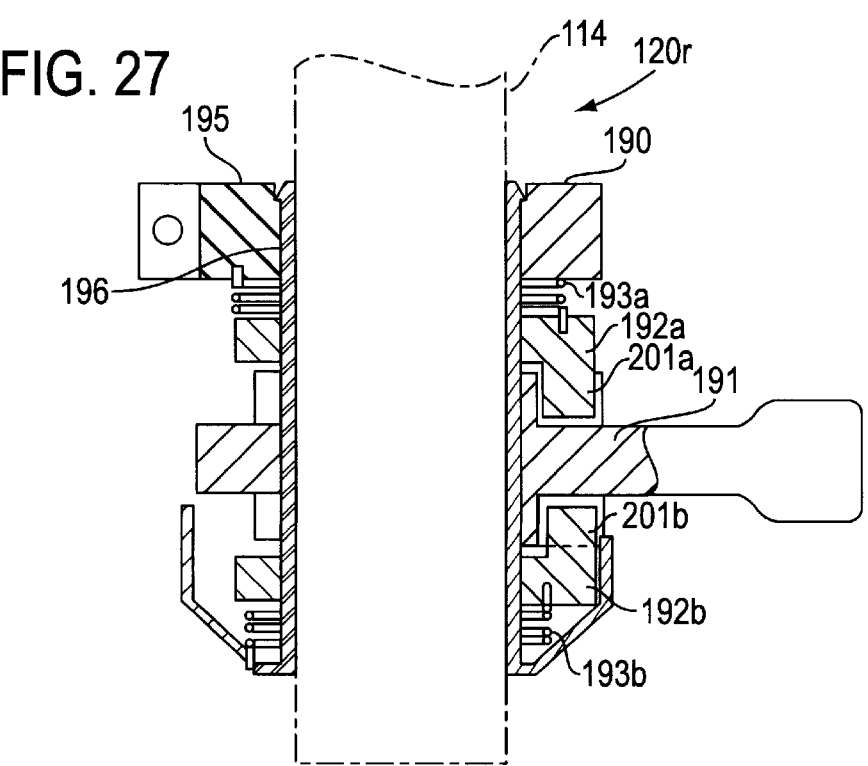
FIG. 27 is a cross sectional view of another alternative embodiment of a second shifting control device similar to the device shown in FIG. 24.

In the above embodiment, the design was such that the control cable 121*a* was stopped by the auxiliary shift lever 191, but as shown in FIG. 27, two rotary members 192*a* and 192*b* may be provided, one on either side of the auxiliary shift lever 191, and the control cables 121*a* and 121*b* may be stopped by the rotary members 192*a* and 192*b*, respectively. In this case, the auxiliary shift lever 191 rotates in both directions, but the rotary member 192*a* only follows this rotation in one direction of the auxiliary shift lever 191, and the rotary member 192*b* only follows the rotation in the other direction of the auxiliary shift lever 191. The two rotary members 192*a* and 192*b* are energized in opposite directions by the torsion coil spring 193*a* and 193*b*. Again in this embodiment, a shift can be made easily and reliably since an upshift or downshift can be made according to the rotational direction of the single control lever.

Figure 28:
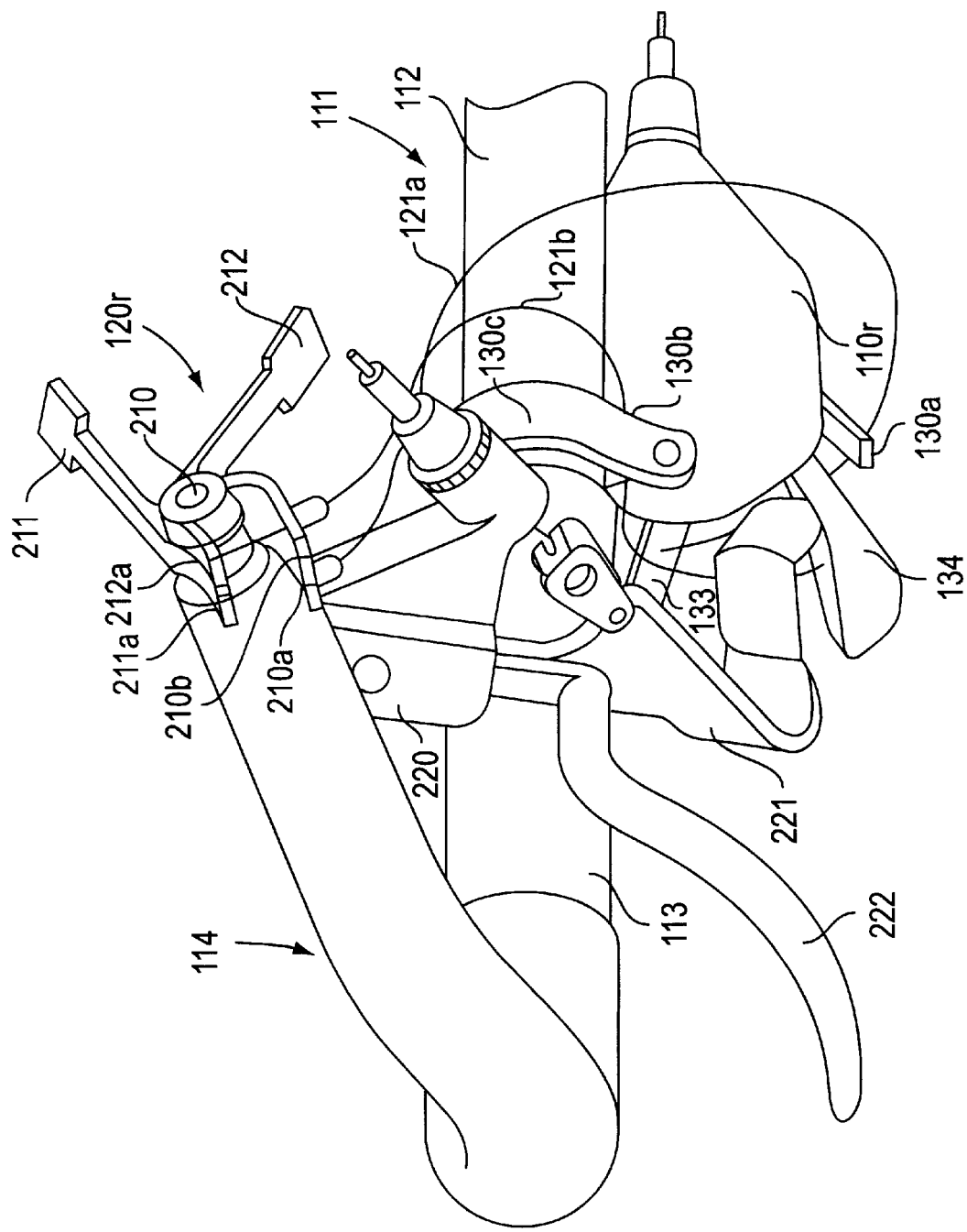
FIG. 28 is an oblique detail view of the right side portion of the handlebar for another alternative embodiment of a bicycle shifting control mechanism according to the present invention.

In the above embodiment, the brake lever 121 was only provided to the main bar 112, so shift control could not be performed on the bar end 114 side, but as shown in FIG. 28, the main shift control device 110*r* may be separate from the brake lever 222, and the brake lever 222 may be mounted at the distal end of the bar end 114. Also, the auxiliary shift control device 120r may be mounted directly at the distal end of the bar end 114.

In FIG. 28, the main shift control device 110r comprises a main control bracket 130c and a first shift lever 133 and second shift lever 134 that are rotatably supported inside the main control bracket 130c. The main control bracket 130c is provided with outer casing stopping components 130a and 130b that stop the outer casings of the two control cables 121a and 121b. The rest of the structure is the same as that in the main shift control device described above, and as such will not be described here.

The auxiliary shift control device 120r has a rotary bracket 210 fixed to the distal end of the bar end 114, and a first auxiliary shift lever 211 and second auxiliary shift lever 212 that are rotatably supported by the rotary bracket 210. The first auxiliary shift lever 211 and second auxiliary shift lever 212 each can be returned to a specific position by a spring (not shown), and the rotational operation thereof begins from this specific position. The first auxiliary shift lever 211 and second auxiliary shift lever 212 are provided with inner cable stopping components 211a and 212a, respectively. The auxiliary control bracket 210 is provided with outer casing stopping components 210a and 210b.

Meanwhile, a brake bracket 220 and the bar end 114 are mounted integrally or separately to the distal end of the bar end 114. A first brake lever 221 that extends to the grip 113 side, and a second brake lever 222 that extends along the bar end 114, are integrally and rotatably supported by the brake bracket 220. With a structure such as this, shift control and braking control can both be performed with the bar end 114, so shift control and braking control can both be performed easily and reliably from two handle positions.

While the above is a description of various embodiments of the present invention, further modifications may be employed without departing from the spirit and scope of the present invention. For example, the first and second front shifting control devices 9 and 16 in the embodiments disclosed in FIGS. 1–12 were types in which wires are driven by shifting levers, and these wires are returned by the same shifting levers. These front shifting control devices 9 and 16, however, may have another well-known structure not of this type, in which a ratchet mechanism is internally installed, and in which the wires are transported and driven by the shifting levers but are stopped by the ratchet mechanism, with a release lever provided to disconnect this engagement. The first rear shifting control device 10 and second rear shifting control device 20 may also have another structure and function. Although the shifting levers did not return to the operating positions in the aforementioned first and second front shifting control devices 9 and 16, they may be types that do return to the original position every time they are operated.

Although the interlocking of the shifting control device 11 and shifting control device 22 was effected with the cable 13 in the embodiments described in FIGS. 1–12, it may also be effected by another method, such as where the wire-winding drum 44 and the shifting control lever 22 are interlocked by a rod, or where a winding drum (no wire) driven by a shift control lever 22 and the wire-winding drum 44 are interlocked with a rod or push-pull cable.

The same kinds of modifications also could be applied to the embodiments shown in FIGS. 13–28. Furthermore, in the embodiments shown in FIGS. 13–28, the auxiliary shift control devices 120f and 120r were mounted to the bar end 114 of a mountain bike, but the present invention is not limited to this, and the auxiliary shift control devices may instead be mounted to the DH bar (also known as an aero bar) of a road bike. Also, the auxiliary shift control devices 120f and 120r were mounted to the bar end 114, and the main shift control devices 110f and 110r were mounted to the main bar 112, but the present invention is not limited to this, and the main shift control devices 110f and 110r may instead be mounted to the bar end 114, and the auxiliary shift control devices 120f and 120r to the main bar 112.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle shifting control apparatus for a bicycle transmission, the apparatus comprising:
    a first shifting control device (9,10,110f,110r) located at a first position on the bicycle, the first shifting control device including a first rotating member (24,11,133, 134) for causing the first shifting control device (9,10, 110f,110r) to operate a first transmission element (25, 12,140);
    a second shifting control device (16,20,120f,120r) located at a second position on the bicycle, the second shifting control device (16,20,120f,120r) including a second rotating member (26,22,161,162,191,211,212) for causing the second shifting control device (16,20,120f, 120r) to operate a second transmission element (27,15, 121a,121b); and
    interlocking means (72,63,66,145a,147a) for interlocking the first shifting control device (9,10,110f,110r) and the second shifting control device (16,20,120f,120r) so that movement of either the first rotating member (24,11, 133,134) or the second rotating member (26,22,161, 162,191,211,212) causes the first shifting control device (9,10,110f,110r) to operate the first transmission element (25,12,140).

2. The apparatus according to claim 1 wherein the interlocking means comprises a coupler (63,66) for coupling the first transmission element (25,12) and the second transmission element (27,15) together.

3. The apparatus according to claim 2 wherein the coupler (66) comprises a joint for coupling the first transmission element (25,12) and the second transmission element (27, 15) together and to a third transmission element (67) so that the third transmission element (67) may be coupled to the bicycle transmission.

4. The apparatus according to claim 3 further comprising a guide (69) in which the joint is slidingly disposed.

5. The apparatus according to claim 2 wherein the first shifting control device (9,10) comprises:
    a first winding drum (44) coupled to the first rotating member (24,11) for winding and unwinding a cable (59,14,140a) of the first transmission element (25,12).

6. The apparatus according to claim 5 wherein the second shifting control device (16,20) comprises:
    a second winding drum (44) coupled to the second rotating member (26,22) for winding and unwinding a cable (60,13) of the second transmission element (27, 15).

7. The apparatus according to claim 5 wherein the first shifting control device (9,10) further comprises:
    a first positioning unit (38,39,41) coupled to the first rotating member (24,11) for positioning the first rotating member (24,11) at discrete locations.

8. The apparatus according to claim 7 wherein the second shifting control device (16,20) comprises:
   a second winding drum (44) coupled to the second rotating member (26,22) for winding and unwinding a cable (60,13) of the second transmission element (27, 15); and
   a second positioning unit (38,39,41) coupled to the second rotating member (26,22) for positioning the second rotating member (26,22) at discrete locations.

9. The apparatus according to claim 1 wherein the interlocking means (72,145a,147a) couples the second transmission element (27,15,121a,121b) to the first shifting control device (9,10,110f,110r) so that movement of the first rotating member (24,11,133,134) causes movement of the second transmission element (27,15,121a,121b).

10. The apparatus according to claim 9 wherein the interlocking means (72,145a,147a) comprises a coupler (72,145a,147a) for coupling the second transmission element (27,15,121a,121b) to the first rotating member (24,11, 133,134).

11. The apparatus according to claim 10 wherein the coupler (72) comprises a ball joint.

12. The apparatus according to claim 9 wherein the second rotating member (26,22) has first and second ends, wherein the second rotating member (26,22) is pivotably coupled to the second shifting control device (16,20) between the first end and the second end, wherein the first end has a manual control surface, and wherein the second end is coupled to the second transmission element (27,15).

13. The apparatus according to claim 9 wherein the first shifting control device (9,10) comprises:
   a first winding drum (44) coupled to the first rotating member (24,11) for winding and unwinding a cable (59,14,140a) of the first transmission element (25,12).

14. The apparatus according to claim 13 wherein the first shifting control device (9,10) further comprises:
   a first positioning unit (38,39,41) coupled to the first rotating member (24,11) for positioning the first rotating member (24,11) at discrete locations.

15. The apparatus according to claim 14 wherein the second rotating member (26,22) has first and second ends, wherein the second rotating member (26,22) is pivotably coupled to the second shifting control device (16,20) between the first end and the second end, wherein the first end has a manual control surface, and wherein the second end is connected to the second transmission element (27,15).

16. The apparatus according to claim 1 wherein the first transmission element (25,12,140) comprises a first cable (59,14,140a), and wherein the second transmission element (27,15,121a,121b) comprises a second cable (60,13,123a, 123b).

17. The apparatus according to claim 1 wherein the first rotating member (24,11,133,134) comprises a first shifting lever (24,11,133,134).

18. The apparatus according to claim 1 wherein the second rotating member (26,22,161,162,191,211,212) comprises a second shifting lever (26,22,161,162,191,211,212).

19. The apparatus according to claim 1 wherein the first rotating member (24,11,133,134) comprises a first shifting lever (24,11,133,134), and wherein the second rotating member (26,22,161,162,191,211,212) comprises a second shifting lever (26,22,161,162,191,211,212).

20. The apparatus according to claim 1 wherein the first shifting control device (110f,110r) includes a third rotating member (133,134) for causing the first shifting control device (110f,110r) to operate the first transmission element (140).

21. The apparatus according to claim 20 wherein the first shifting control device (110f,110r) is adapted to pull a cable (140a) of the first transmission element (140) in response to movement of the first rotating member (133), and wherein the first shifting control device (110f,110r) is adapted to release the cable (140a) of the first transmission element (140) in response to movement of the third rotating member (134).

22. The apparatus according to claim 21 further comprising a third transmission element (121a,121b), wherein the interlocking means (145a,147a)couples the second transmission element (121a,121b) and the third transmission element (121a,121b) to the first shifting control device (110f,110r) so that rotating the second rotating member (191) in one direction causes the first shifting control device (110f,110r) to pull the cable (140a) of the first transmission element (140), and rotating the second rotating member (191) in an opposite direction causes the first shifting control device (110f,110r) to release the cable (140a) of the first transmission element (140).

23. The apparatus according to claim 22 wherein the interlocking means (145a,147a) couples the second transmission element (121a,121b) and the third transmission element (121a,121b) to the first shifting control device (110f,110r) so that rotating the second rotating member (191) in one direction rotates only the first rotating member (133,134), and rotating the second rotating member (191) in an opposite direction rotates only the third rotating member (133,134).

24. The apparatus according to claim 23 further comprising a biasing mechanism (193a,193b) for biasing the second rotating member (191) to an initial position.

25. The apparatus according to claim 23 wherein the second transmission element (121a,121b) comprises a first cable (123a,123b), and wherein the third transmission element (121a,121b) comprises a second cable (123a,123b).

26. The apparatus according to claim 23 wherein the first and third rotating members (133,134) each comprises a lever.

27. The apparatus according to claim 23 wherein the second rotating member (191) comprises a lever.

28. The apparatus according to claim 23 wherein the first rotating member (133), the second rotating member (191) and the third rotating member (134) each comprises a lever.

29. The apparatus according to claim 21 wherein the second shifting control device (110f,110r) includes a fourth rotating member (161,162,211,212) for causing the second shifting control device (120f,120r) to operate a third transmission element (121a,121b), and wherein the interlocking means (145a,147a) interlocks the first shifting control device (110f,110r) and the second shifting control device (120f,120r) so that movement of either the first rotating member (133,134), the second rotating member (161,162, 211,212), the third rotating member (133,134), or the fourth rotating member (161,162,211,212) causes the first shifting control device (110f,110r) to operate the first transmission element (140).

30. The apparatus according to claim 29 wherein the interlocking means (145a) connects the second transmission element (121a) to the first shifting control device (110f,110r) so that movement of the second rotating member (161,211) causes the first shifting control device (110f,110r) to pull a cable (140a) of the first transmission element (140), and wherein the interlocking means (147a) connects the third transmission element (121b) to the first shifting control device (110f,110r) so that movement of the fourth rotating member (162,212) causes the first shifting control device (110f,110r) to release a cable (140a) of the first transmission element (140).

31. The apparatus according to claim 30 wherein the interlocking means (145a,147a) comprises:
  a first coupler (145a) for coupling the second transmission element (121a) to the first rotating member (133); and
  a second connector (147a) for connecting the third transmission element (121b) to the third rotating member (134).

32. The apparatus according to claim 31 further comprising a biasing mechanism (163,163a,163b) for biasing the second and fourth rotating members (161,162) to an initial position.

33. The apparatus according to claim 31 wherein the second transmission element (121a) comprises a first cable (123a), and wherein the third transmission element (121b) comprises a second cable (123b).

34. The apparatus according to claim 31 wherein the first and third rotating members (133,134) each comprises a lever.

35. The apparatus according to claim 31 wherein the second and fourth rotating members (161,162,211,212) each comprises a lever.

36. The apparatus according to claim 31 wherein the first rotating member (133), the second rotating member (161, 211), the third rotating member (134) and the fourth rotating member (162,212) each comprises a lever.

37. A bicycle shift control apparatus for a bicycle transmission, the apparatus comprising:
  a shifting control device (9,10,110f,110r) adapted to be connected to a transmission control element (25,12, 140) used to control the bicycle transmission, the shifting control device (9,10,110f,110r) including a first shifting lever (24,11,133,134) for causing the shifting control device (9,10,110f,110r) to operate the transmission control element (25,12,140); and
  a first coupler (72,145a,147a) for coupling the shifting controls device (9,10,110f,110r) to a first transmission element (13,60,121a,121b) different from the transmission control element (25,12,140).

38. The apparatus according to claim 37 wherein the first coupler (72,145a,147a) is disposed on the first shifting lever (24,11,133,134).

39. A bicycle shift control apparatus for a bicycle transmission, the apparatus comprising:
  a shifting control device (110f,110r) adapted to be connected to a transmission control element (140) used to control the bicycle transmission, the shifting control device (110f,110r) including a first rotating member (133,134) for causing the shifting control device (110f, 110r) to operate the transmission control element (140);
  a biasing mechanism (152,153) for biasing the first rotating member (133,134) to an initial position; and
  a first coupler (145a,147a) for coupling the shifting control device (110f,110r) to a first transmission element (121a,121b) different from the transmission control element (140).

40. The apparatus according to claim 39 wherein the first coupler (145a,147a) is disposed on the first rotating member (133,134).

41. The apparatus according to claim 39 wherein the first rotating member (133,134) comprises a first shifting lever (133,134).

42. A bicycle shift control apparatus for a bicycle transmission, the apparatus comprising:
  a shifting control device (110f,110r) adapted to be connected to a transmission control element (140) used to control the bicycle transmission, the shifting control device (110f,110r) including:
    a first rotating member (133) for causing the shifting control device (110f,110r) to operate the transmission control element (140) in one direction;
    a second rotating member (134) for causing the shifting control device (110f,110r) to operate the transmission control element (140) in an opposite direction; and
    a first coupler (145a,147a) for coupling the shifting control device (110f,110r) to a first transmission element (121a,121b) different from the transmission control element (140).

43. The apparatus according to claim 42 further comprising a biasing mechanism (152,153) for biasing the first rotating member (133) and the second rotating member (134) to respective initial positions.

44. The apparatus according to claim 42 wherein the transmission control element (140) comprises a cable (140a), and further comprising a winder (131), wherein the winder (131) pulls the cable (140a) in response to rotation of the first rotating member (133), and wherein the winder (131) releases the cable (140a) in response to rotation of the second rotating member (134).

45. The apparatus according to claim 42 wherein the first rotating member (133) rotates in a first direction for causing the shifting control device (110f,110r) to operate the transmission control element (140) in the one direction, and wherein the second rotating member (134) rotates in an opposite second direction for causing the shifting control device (110f,110r) to operate the transmission control element (140) in the opposite direction.

46. The apparatus according to claim 42 further comprising a second coupler (145a,147a) for coupling the shifting control device (110f,110r) to a second transmission element (121a,121b) different from the transmission control element (140).

47. The apparatus according to claim 46 wherein the first rotating member (133) comprises a first shifting lever (133), and wherein the second rotating member (134) comprises a second shifting lever (134).

48. The apparatus according to claim 47 wherein the first coupler (145a) is adapted to couple the first transmission element (121a) to the first shifting lever (133), and wherein the second coupler (147a) is adapted to couple the second transmission element (121b) to the second lever (134).

49. The apparatus according to claim 46 wherein the first rotating member (133) and the second rotating member (134) are rotatably supported on a main bracket (130), wherein the first coupler (145a) is adapted to couple an inner cable (123a) of the first transmission element (121a) to the first rotating member (133), wherein the second coupler (147a) is adapted to couple an inner cable (123b) of the second transmission element (121b) to the second rotating member (134), and wherein the main bracket (130) includes:
  a first stopper (130a) for stopping an outer casing (125a) of the first transmission element (121a); and
  a second stopper (130b) for stopping an outer casing of the second transmission element (121b).

50. An auxiliary shift lever apparatus for a bicycle having a main shifting control device (9,10,110f,110r) for operating a transmission control element (25,12,140) connected to a bicycle transmission, wherein the shifting control device (9,10,110f,110r) includes (a) a first main rotating member (24',11',133,134) for causing the main shifting control device (9,10,110f,110r) to operate the transmission control element (25,12,140), and (b) a first transmission element (27,15,121a,121b), the auxiliary shifting apparatus comprising:
  a first auxiliary rotating member (26',22',161,162,191, 211,212);

a mounting member (165,195,210) adapted to rotatably mount the first auxiliary rotating member (26',22',161, 162,191,211,212) to a handlebar (5',6',114); and a first coupler (72,171,172,192a,192b,210a,210b) for coupling the first auxiliary rotating member (26',22', 161,162,191,211,212) to the first transmission element (27,15,121a,121b).

51. The apparatus according to claim 50 wherein the first auxiliary rotating member (26',22',161,162,191,211,212) comprises a first auxiliary shift lever (26',22',161,162,191, 211,212).

52. The apparatus according to claim 50 further comprising a biasing mechanism (163,163a,163b,193a) for biasing the first auxiliary shifting lever (161,162,191,211,212) to an initial position.

53. The apparatus according to claim 50 wherein the main shifting control device (110f,110r) includes (c) a second main rotating member (133,134) for causing the shifting control device (110f,110r) to operate the transmission control element (140), and (d) a second transmission element (121a,121b), and wherein the auxiliary shift lever apparatus further comprises:

a second auxiliary rotating member (161,162,211,212) rotatably mounted to the base member (165,210); and a second coupler (171,172,210a,210b) for coupling the second auxiliary rotating member (161,162,211,212) to the second transmission element (121a,121b).

54. The apparatus according to claim 53 further comprising:

a first biasing mechanism (163,163a) for biasing the first auxiliary rotating member (161) to an initial position; and a second biasing mechanism (163,163b) for biasing the second auxiliary rotating member (162) to an initial position.

55. The apparatus according to claim 53 wherein the first and second auxiliary rotating members (161,162) rotate in a same direction to operate the first and second transmission elements (121a,121b).

56. The apparatus according to claim 53 wherein the first and second auxiliary rotating members (161,162) rotate in opposite directions to operate the first and second transmission elements (121a,121b).

57. The apparatus according to claim 50 wherein the main shifting control device (110f,110r) includes (c) a second main rotating member (133,134) for causing the shifting control device (110f,110r) to operate the transmission control element (140), and (d) a second transmission element (121a,121b) coupled to move the second main rotating member (133,134), and wherein the auxiliary shift lever apparatus further comprises a second coupler (192a,192b) for coupling the first auxiliary rotating member (191) to the second transmission element (121a,121b).

58. The apparatus according to claim 57 wherein the first auxiliary rotating member (191) comprises a lever.

59. The apparatus according to claim 58 wherein the first coupler (192a) is disposed on the first auxiliary rotating member (191).

60. The apparatus according to claim 59 further comprising a second auxiliary rotating member (192), and wherein the second coupler (192b) is disposed on the second auxiliary rotating member (192).

61. The apparatus according to claim 60 wherein the first auxiliary rotating member (191) causes rotation of the second auxiliary rotating member (192) when the first auxiliary rotating member (191) rotates in a selected direction.

62. The apparatus according to claim 61 further comprising a biasing mechanism (193a,193b) for biasing the first auxiliary rotating member (191) to an initial position.

63. The apparatus according to claim 58 further comprising:

a second auxiliary rotating member (192a), wherein the first coupler is disposed on the second auxiliary rotating member (192a);

a third auxiliary rotating member (192b), wherein the second coupler is disposed on the third auxiliary rotating member (192b).

64. The apparatus according to claim 63 wherein the first auxiliary rotating member (191) causes rotation of the second auxiliary rotating member (192a) when the first auxiliary rotating member (191) rotates in a first direction, and wherein the first auxiliary rotating member (191) causes rotation of the third auxiliary rotating member (192b) when the first auxiliary rotating member (191) rotates in an opposite second direction.

65. The apparatus according to claim 64 further comprising a biasing mechanism (193a,193b) for biasing the first auxiliary rotating member (191) to an initial position.

* * * * *